US011871338B2

(12) United States Patent
Misra et al.

(10) Patent No.: US 11,871,338 B2
(45) Date of Patent: Jan. 9, 2024

(54) DISTRIBUTED MULTI-ACCESS EDGE SERVICE DELIVERY

(71) Applicant: INTERNATIONAL BUSINESS MACHINES CORPORATION, Armonk, NY (US)

(72) Inventors: Dharmendra Misra, Pune (IN); Abhinav Aggarwal, Chapel Hill, NC (US); Tapasi Sengupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/244,317

(22) Filed: Apr. 29, 2021

(65) Prior Publication Data
US 2022/0353801 A1     Nov. 3, 2022

(51) Int. Cl.
*H04W 48/18*     (2009.01)
*H04W 28/24*     (2009.01)
(Continued)

(52) U.S. Cl.
CPC .......... *H04W 48/18* (2013.01); *H04W 24/02* (2013.01); *H04W 24/10* (2013.01); *H04W 28/0958* (2020.05); *H04W 28/24* (2013.01)

(58) Field of Classification Search
None
See application file for complete search history.

(56) References Cited

U.S. PATENT DOCUMENTS

| | | | |
|---|---|---|---|
| 2005/0273668 A1* | 12/2005 | Manning | H04L 12/66 714/39 |
| 2019/0155663 A1* | 5/2019 | Erickson | G06F 40/263 |

(Continued)

FOREIGN PATENT DOCUMENTS

| | | | | |
|---|---|---|---|---|
| EP | 3591549 A1 * | 1/2020 | ............. | G06F 21/10 |
| WO | WO2017066936 A1 | 4/2017 | | |

(Continued)

OTHER PUBLICATIONS

Shahzadi, et al., "Multi-access edge computing: open issues, challenges and future perspectives", Journal of Cloud Computing: Advances, Systems and Applications, 2017, retrieved on May 17, 2021 from the Internet URL: <https://link.springer.com/article/10.1186/s13677-017-0097-9>, 13 pgs. On information and belief, and according to the current review, the content of this document was published prior to the filing date of the current application.
Patel, et al., "Mobile-Edge Computing—Introductory Technical White Paper", Sep. 2014, retrieved on May 17, 2021 from the Internet URL: <https://portal.etsi.org/Portals/0/TBpages/MEC/Docs/Mobile-edge_Computing_-_Introductory_Technical_White_Paper_V1%2018-09-14.pdf>, 36 pgs.

(Continued)

*Primary Examiner* — Joseph E Avellino
*Assistant Examiner* — Anindita Sen
(74) *Attorney, Agent, or Firm* — Nicholas Welling; George S. Blasiak; Heslin Rothenberg Farley & Mesiti P.C.

(57) ABSTRACT

Methods, computer program products, and systems are presented. The method computer program products, and systems can include, for instance: examining capability data of a shared ledger data structure, wherein the capability data specifies one or more capability for respective ones of a plurality of service capability applications; joining a service capability application of the plurality of service capability applications to a service delivery application in dependence on the examining; and running the service delivery application, with the service capability application joined to the service delivery application. .

20 Claims, 16 Drawing Sheets

(51) Int. Cl.
  *H04W 24/02* (2009.01)
  *H04W 24/10* (2009.01)
  *H04W 28/08* (2023.01)

(56) References Cited

U.S. PATENT DOCUMENTS

| | | | |
|---|---|---|---|
| 2020/0008044 A1 | 1/2020 | Poornachandran et al. | |
| 2020/0274942 A1 | 8/2020 | Mueck et al. | |
| 2020/0302431 A1 | 9/2020 | Polehn et al. | |
| 2020/0326989 A1* | 10/2020 | Li | H04L 67/1031 |
| 2021/0112441 A1* | 4/2021 | Sabella | H04L 67/12 |
| 2022/0038289 A1* | 2/2022 | Huang | H04L 63/12 |
| 2022/0103985 A1* | 3/2022 | Khasnabish | H04W 4/50 |
| 2022/0156235 A1* | 5/2022 | Ly | G06F 16/906 |
| 2022/0159535 A1* | 5/2022 | Rahman | H04W 12/062 |

FOREIGN PATENT DOCUMENTS

| | | |
|---|---|---|
| WO | WO2017100640 A1 | 6/2017 |
| WO | WO2020124317 A1 | 6/2020 |

OTHER PUBLICATIONS

"Standards by ISO/TC 307—Blockchain and distributed ledger technologies", retrieved on May 17, 2021 from the Internet URL: <https://www.iso.org/committee/6266604/x/catalogue/p/0/u/1/w/0/d/0>, 2 pgs. On information and belief, and according to the current review, the content of this document was published prior to the filing date of the current application.

"Industry Specification Group (ISG) On Multi-Access Edge Computing (MEC)", retrieved on May 17, 2021 from the Internet URL: <https://www.etsi.org/committee/mec>, 2 pgs. On information and belief, and according to the current review, the content of this document was published prior to the filing date of the current application.

"Welcome to ETSI Forge—Collaborative tools for standardized technologies", retrieved on May 17, 2021 from the Internet URL: <https://forge.etsi.org/>, 4 pgs. On information and belief, and according to the current review, the content of this document was published prior to the filing date of the current application.

"6-3GPP NG-RAN; F1 interface user plane protocol", retrieved on May 17, 2021 from the Internet URL: <https://portal.3gpp.org/desktopmodules/Specifications/SpecificationDetails.aspx?specificationId=3262>, 1 pg. On information and belief, and according to the current review, the content of this document was published prior to the filing date of the current application.

"Multi-access Edge Computing (MEC); General principles for MEC Service APIs", ETSI GS MEC 009 V2.1.1 (Jan. 2019), retrieved on May 17, 2021 from the Internet URL: <https://www.etsi.org/deliver/etsi_gs/MEC/001_099/009/02.01.01_60/gs_MEC009v020101p.pdf>, 3 pgs. On information and belief, and according to the current review, the content of this document was published prior to the filing date of the current application.

Mell, Peter, et al., "The NIST Definition of Cloud Computing", NIST Special Publication 800-145, Sep. 2011, Gaithersburg, MD, 7 pgs.

Global Dossier Report to U.S. Appl. No. 17/244,317; dated Aug. 22, 2023; 1 page.

ETSI Contribution in MEC standardization; https://www.etsi.org/technologies/multi-access-edge-computing; Apr. 14, 2021; 6 pages.

* cited by examiner

DISTRIBUTED MULTI-ACCESS EDGE SERVICE DELIVERY

BACKGROUND

Embodiments herein relate generally to service delivery and particularly to distributed multi-access edge service delivery.

A network service can include an application running at the network application layer and above that provides data storage, manipulation, presentation, communication or other capability which is often implemented using a client-server architecture based on application layer network protocols. Each network service is usually provided by a server component running on one or more computer and accessed via a network by client components running on other devices. However, client and server components may both run on the same machine. In addition, a dedicated server computer may offer multiple network services concurrently.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining capability data of a shared ledger data structure, wherein the capability data specifies one or more capability for respective ones of a plurality of service capability applications; joining a service capability application of the plurality of service capability applications to a service delivery application in dependence on the examining; and running the service delivery application, with the service capability application joined to the service delivery application.

In another aspect, a computer program product can be provided. The computer program product can include a computer readable storage medium readable by one or more processing circuit and storing instructions for execution by one or more processor for performing a method. The method can include, for example: examining capability data of a shared ledger data structure, wherein the capability data specifies one or more capability for respective ones of a plurality of service capability applications; joining a service capability application of the plurality of service capability applications to a service delivery application in dependence on the examining; and running the service delivery application, with the service capability application joined to the service delivery application.

In a further aspect, a system can be provided. The system can include, for example, a memory. In addition, the system can include one or more processor in communication with the memory. Further, the system can include program instructions executable by the one or more processor via the memory to perform a method. The method can include, for example: examining capability data of a shared ledger data structure, wherein the capability data specifies one or more capability for respective ones of a plurality of service capability applications; joining a service capability application of the plurality of service capability applications to a service delivery application in dependence on the examining; and running the service delivery application, with the service capability application joined to the service delivery application.

Additional features are realized through the techniques set forth herein. Other embodiments and aspects, including but not limited to methods, computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
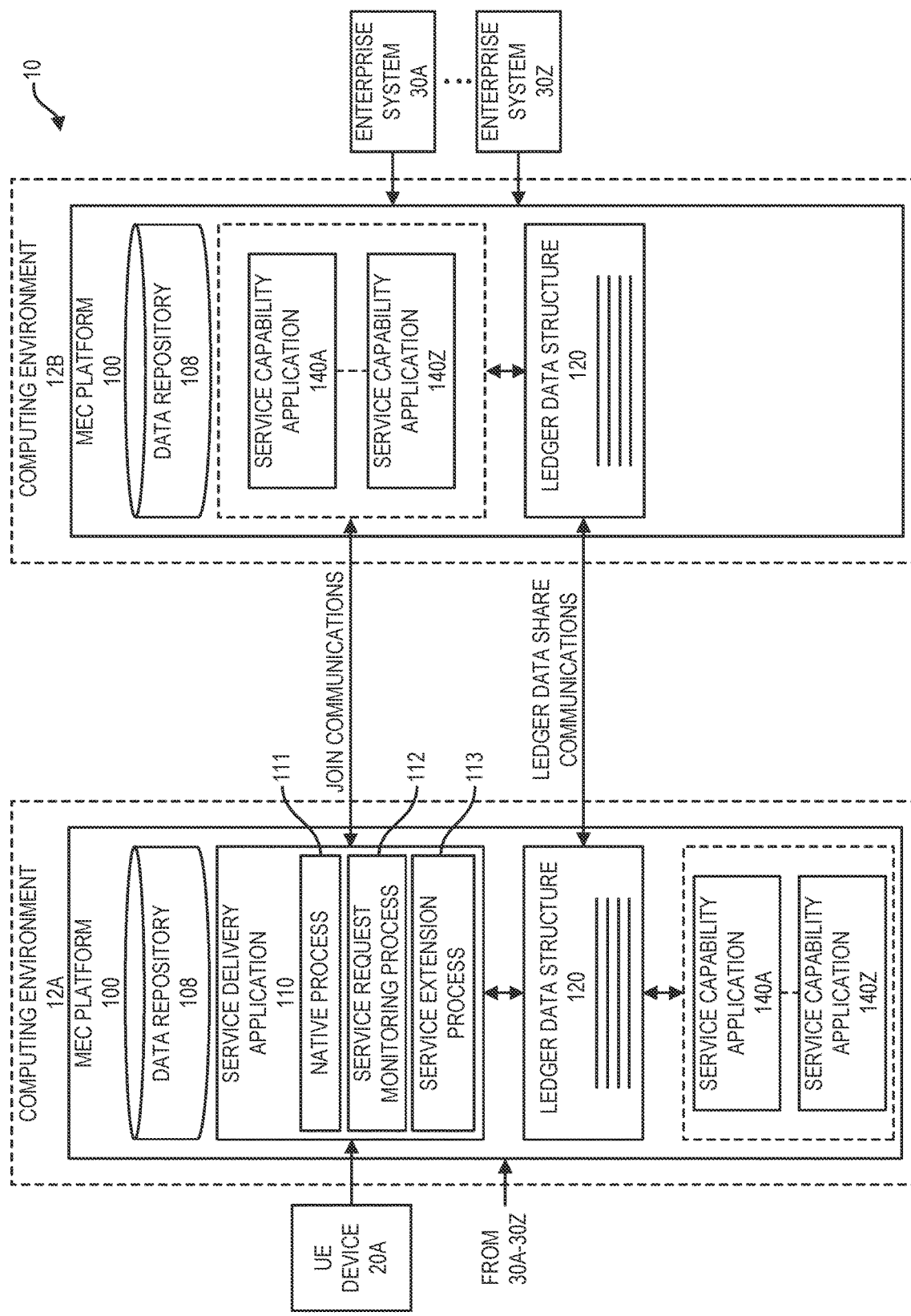
FIG. 1 depicts a multi-access edge (MEC) environment, according to one embodiment.

A multi-access edge (MEC) environment 10 is shown in FIG. 1. MEC environment 10 can include MEC platform 100 disposed in computing environment 12A and MEC platform 100 disposed in computing environment 12B. MEC platform 100 in computing environment 12A can include data repository 108 and can host service delivery application 110. Service delivery application 110 can be in communication with ledger data structure 120 which can be configured as a shared ledger data structure that is shared between MEC platforms 100. MEC platform 100 in computing environment 12B can include data repository 108 and can host service capability applications 140A-140Z which service capability applications 140A-140Z can be in communication with ledger data structure 120. MEC platform 100 of computing environment 12A and MEC platform 100 of computing environment 12B can be computing node-based systems comprising one or more computing node. In one embodiment, computing environment 12A can be an edge computing environment closer to the edge end defined at user equipment (UE) device 20A than computing environment 12B.

A MEC platform 100 herein can include data repository 108. Data repository 108 can store, e.g., an instance of ledger data structure 120 configured as a shared ledger data structure, program images including virtual machine program images, application data including service templates and capability templates as set forth herein.

Embodiments herein recognize that various challenges are faced by enterprise entities wishing to deliver services to end users. Embodiments herein recognize that edge enterprise entities, i.e., enterprise entities that own, operate and/or control edge infrastructure, can be challenged to provide end-to-end services to users such as users of UE devices 20A. Embodiments herein recognize that edge enterprise entities, commonly referred to as communication service providers (edge enterprise entity CSPs), can provide end-to-end services to end users by performing complex full-infrastructure builds requiring extensive resources and planning. However, due to the investment requirements associated to an end-to-end service, an edge enterprise entity may elect not to undertake the risk to build the new service. Entities other than edge enterprise entities can be similarly challenged and can also elect not to undertake risk necessary to provide a service, and without access to edge infrastructure can be limited in the range of services that they offer.

MEC environment 10 is shown in FIG. 1 can have features to facilitate collaboration between enterprise entities interested in providing delivered services to end users. Ledger data structure 120 can be a shared ledger data structure shared between MEC platform 100 of computing environment 12A, MEC platform 100 of computing environment 12B, and additional MEC platforms 100 (not shown in FIG. 1) distributed in computing environments throughout MEC environment 10. Ledger data structure 120 can be provided to facilitate enterprise entities publishing and advertising capabilities data specifying capabilities of their service capability applications. Ledger data structure 120 can include one or more ledger. The one or more ledger of ledger data structure 120 can include a capability ledger and a demand ledger. A capability ledger of ledger data structure 120 can record data on service capability applications of MEC environment 10, and can include a supply ledger that permits an edge enterprise entity to advertise current offers. A demand ledger of ledger data structure 120 can permit an entity to write demand data that specifies a demand for the service capability application having certain attributes.

Ledger data structure 120, according to one embodiment, can be configured as a Blockchain ledger data structure. Ledger data structure 120 can be a distributed ledger structure that can be distributed to be associated with each of a plurality of members of a ledger data structure, e.g., Blockchain network. Members of the ledger data structure network can include, e.g., enterprise entity owners of MEC platforms 100 herein. Enterprise entity owners of MEC platforms 100 herein can act as authorities that mediate access to ledger data structure 120.

According to one embodiment, ledger data structure 120 can be an immutable ledger and can be provided by a Blockchain ledger data structure. Ledger data structure 120, when provided to be compliant with Blockchain, can include a list of records called blocks, which can be linked together using cryptography. Each block can include a cryptographic hash of transaction data (that is, a digital fingerprint), a cryptographic hash of a previous block, a timestamp, and the transaction data. The hash of the transaction data can include a Merkle tree root hash. Ledger data structure 120 can be resistant to modification of data. Ledger data structure 120 can be configured so that once a block of data is recorded into ledger data structure 120, the data cannot be altered retroactively without alteration of all subsequent blocks. According to one embodiment, alteration of ledger data structure 120 can be restricted and can be permissible, e.g., only on consensus of ledger data structure network members. Each block of ledger data structure 120 can include a cryptographic hash of transaction data, a cryptographic hash of a previous block, a timestamp, and the transaction data. A previous block hash can link the blocks together and prevent any block from being altered or a block from being inserted between two existing blocks, and accordingly, each subsequent block strengthens the verification of the previous block and, hence the entire blockchain. The described process renders the blockchain tamper evident leading to the attribute of immutability.

MEC environment 10 can be configured so that enterprise entities can write capabilities data to the capability ledger to register services capabilities into ledger data structure 120. MEC environment 10 can also be configured so that enterprise entities can write demand data defining demands for service capabilities applications into a demand ledger of ledger data structure 120. In some scenarios, demand data written to a demand ledger of ledger data structure 120 can be generated responsively to the running of service delivery application 110.

Service delivery application 110 can be a dynamic service delivery application that can dynamically extend service features during the miming of service delivery application 110. In one embodiment, service delivery application 110 can use ledger data structure 120 to dynamically extend service features during the running of service delivery application 110. Dynamic extending of service features can include service delivery application 110 joining one or more service capability application hosted within MEC environment 10 during the running of the service delivery application 110. The one or more joined service capability application providing an extended service feature can be a service capability application developed by an enterprise entity other than the enterprise entity providing service delivery application 110.

Service delivery application 110 can run one or more native process 111, service request monitoring process 112, and service extension process 113. The one or more native process 111 can provide baseline functionality for a service delivery application 110. The one or more native process can take on numerous forms depending on the application. Service delivery application 110 running service request monitoring process 112 can monitor for service function extension requests such as requests for service function extensions based on user defined input data of a user such as a user of UE device 20A as shown in FIG. 1. Service delivery application 110 running service extension process 113 can, in response to detection of a service feature extension request, extend service features of a current service delivery application defined by service delivery application 110. Service delivery application 110 running service extension process 113 can include use of ledger data structure 120 to identify one or more service capability application suitable for use with a service delivery application.

MEC environment 10 can be configured so that multiple enterprise entities can write capabilities data to ledger data structure 120 in order to advertise their service capability applications. Within MEC environment 10, various enterprises can run service delivery applications such as service delivery application 110 which can join one or more service capability application during runtime of the service delivery applications.

At least one MEC platform within MEC environment 100 can be a multi-tenancy MEC platform configured to host service capability applications of multiple enterprise entities. In the embodiment of FIG. 1, MEC platform 100 of computing environment 12B can be a publicly accessible multi-tenancy MEC platform and can host service capability applications 140A-140Z developed by multiple different enterprise entities. In the embodiment of FIG. 1, MEC platform 100 of computing environment 12B can be configured so that enterprise systems 30A-30Z of multiple different enterprises, e.g., by automated process and/or agent developer user action, initiate hosting of their developed service capability applications on MEC platform 100 of computing environment 12B. An enterprise entity associated to one of enterprise systems 30A-30Z can be any enterprise, e.g., an edge enterprise entity or a non-edge enterprise entity. An edge enterprise entity can be an enterprise entity that owns, operates and/or controls edge infrastructure such as an edge network provided by radio access network (RAN). A non-edge enterprise can be an enterprise entity that does not own, operate or control edge infrastructure.

Enterprise systems 30A-30Z, e.g., on an automated process or under the operation of an enterprise agent user, can develop service capability applications for hosting on MEC platform 100 of computing environment 12B. Enterprise entities associated to enterprise systems 30A-30Z can present to an authority associated to MEC platform 100 a service capability application and capability data for entry into ledger data structure 120 specifying capabilities of the service capability application. The authority associated to MEC platform 100 can be the enterprise entity that owns MEC platform 100 according to one embodiment. The authority on approval of the service capability application can permit hosting of the service capability application on MEC platform 100 of computing environment 12B and entry of the presented capabilities data on ledger data structure 120. On preparation of a service capability application and on approval of the authority associated to MEC platform 100 of computing environment 12B, enterprise systems 30A to 30Z can write capabilities data to the capability ledger of shared ledger data structure 120 specifying attributes of the service capability application. On approval by the authority associated to MEC platform 100 of computing environment 12B, capabilities data associated to the service capability application can be stored in the capability ledger of ledger data structure 120, and MEC platform 100 of computing environment 12B can host the newly developed service capability application. Service capability applications 140A to 140Z hosted by MEC platform 100 can be developed by a plurality of different enterprises, which enterprises can be enterprises other than edge enterprises which do not own, operate or control edge infrastructure. In spite of being developed by enterprises other than edge enterprises, service capability applications 140A-140Z of MEC platform 100 within computing environment 12B can be readily integrated into service delivery applications of an edge enterprise.

Service capability applications, which can extend and enhance the functioning of service delivery application 110 hosted on MEC platform of computing environment 12A, can be conveniently hosted on MEC platform 100 of computing environment 12A or any computing node having network connectivity to MEC platform 100 of computing environment 12A. MEC platform 100 of computing environment 12B can host a plurality of service capability applications 140A to 140Z. MEC platform 100 of computing environment 12B can be configured to be in communication with a plurality of enterprise systems 30A-30Z, which can present service capability applications for hosting on MEC platform of computing environment 12B.

In the embodiment of FIG. 1, MEC platform 100 of computing environment 12A hosting service delivery application 110 can be owned, controlled, and/or operated by an edge enterprise entity owning, controlling and/or operating the infrastructure defining computing environment 12A. In the embodiment of FIG. 1, MEC environment 10 can be configured to permit collaboration between an edge enterprise entity and another enterprise entity in the delivery of a service to an end user.

Service delivery application 110 can be configured so that in response to detecting a service extension request, service delivery application 110 can use ledger data structure 120 to identify a suitable services capability application to perform the function and can join the service capability application into service delivery application 110.

In using ledger data structure 120 to identify a suitable service capability application for joining with service delivery application 110, service delivery application 110 can examine capability data of a capability ledger within ledger data structure 120. In using ledger data structure 120 to identify a suitable service capability application to join with service delivery application 110, service delivery application 110 can additionally write demand data to a demand ledger of ledger data structure 120. In response to the demand data, an enterprise entity monitoring the demand ledger of ledger data structure 120 can write additional capability data specifying attributes of service capability applications including updated capability data of prior service capability applications of the enterprise entity and capability data of new service capability applications of the enterprise entity being made available by the capability provider enterprise entity in response to the monitoring of the demand data. Service delivery application 110 can examine the additional capability data written responsively to the demand data. Service delivery application 110 can dynamically write a demand to a demand ledger of ledger data structure 120 during runtime processing of the service delivery application, e.g., in response to detection of a service function extension request.

Embodiments herein facilitate rapid development of service delivery applications by edge enterprise entities so that detailed service functionalities can be satisfied by service capability applications developed by enterprises other than the edge enterprise entity. The association of a service capability application to service delivery application 110 can be facilitated by ledger data structure 120. For extension of a service delivery application 110, service delivery application 110 can examine capabilities data of a ledger data structure 120 in order to identify a suitable service capability application for integration into service delivery application 110 and can write a demand entry to a demand ledger of ledger data structure 120 in order to specify a demand for a service capability application that would be integrated into service delivery application 110.

MEC environment 10 can include computing environment 12A and computing environment 12B. In one embodiment, computing environment 12A can be provided by an edge infrastructure computing environment defined within an edge network and computing environment 12B can be a non-edge infrastructure computing environment farther from an edge end than computing environment 12A. In one embodiment, computing environment 12A and computing environment 12B can be edge infrastructure computing environments. In one embodiment, computing environment 12A can be closer to an edge end at UE device 20A than computing environment 12B. MEC environment 10 can facilitate collaboration between different enterprise entities in the delivery of services to end users.

Service delivery application 110 can run one or more native process 111, service request monitoring process 112 and service extension process 113. Service delivery application 110 running service request monitoring process 112 can include service delivery application monitoring application data for service extension requests. Service delivery application 110 running service extension process 113 can include service delivery application 110 joining to service delivery application 110 one or more service capability application. The one or more service capability application can include one or more service capability application developed by an entity other than the enterprise entity developing service delivery application 110. In one embodiment, the enterprise entity developing service delivery application 110 hosted on MEC platform 100 of computing environment 12A can be an edge enterprise entity that owns, operates, and/or controls infrastructure of an edge network.

Figure 2:
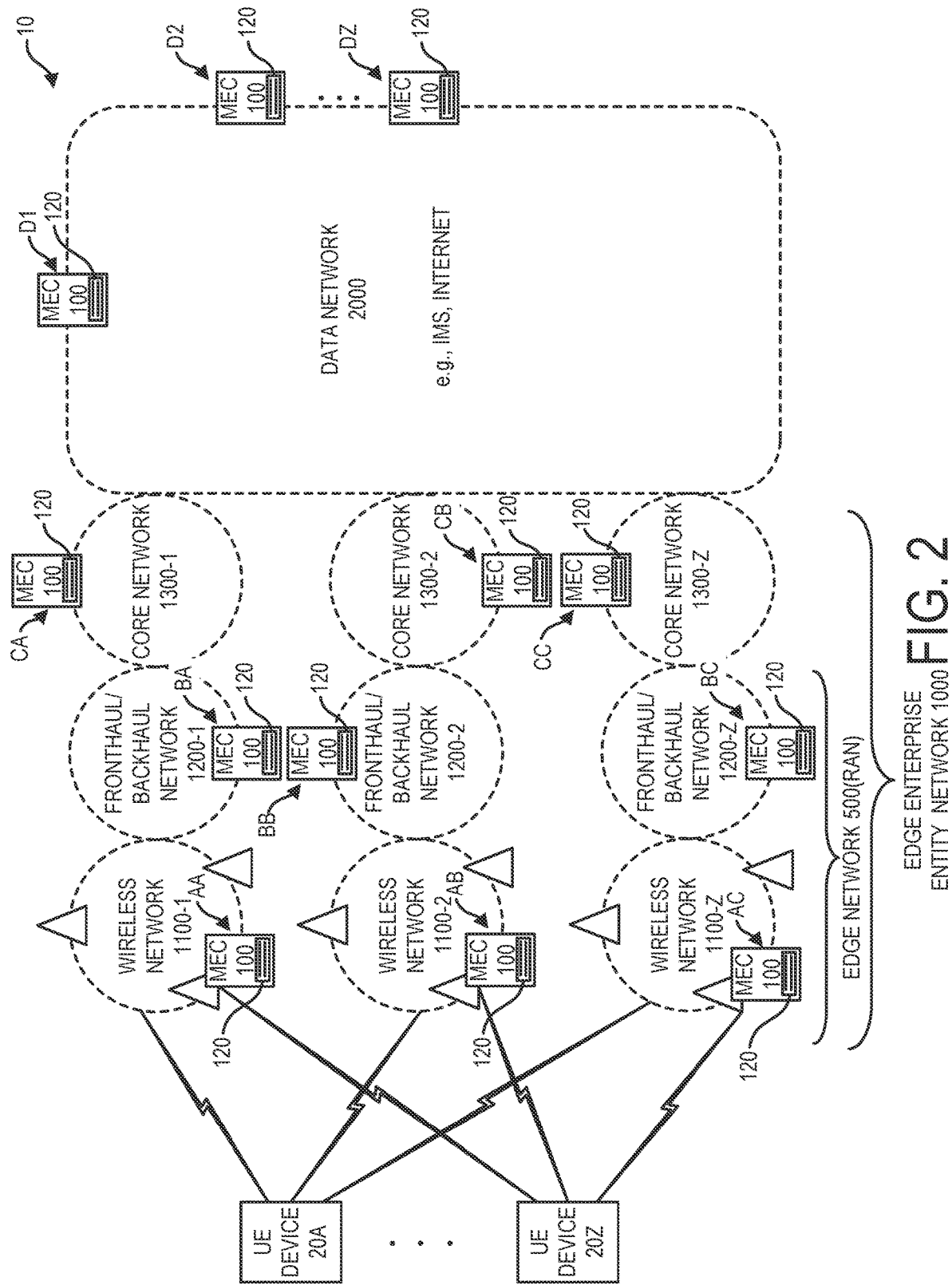
FIG. 2 depicts a MEC environment, according to one embodiment.

FIG. 2 depicts MEC environment 10 in further detail. MEC environment 10 can include UE devices 20A-20Z in communication with data network 2000 via a plurality of edge enterprise entity networks 1000. Respective edge enterprise entity networks 1000 can include edge infrastructure owned, operated, and/or controlled by respective different edge entities. The first edge enterprise entity can own, operate, and/or control the edge network infrastructure comprising wireless network 1100-1, fronthaul/backhaul network 1200-1, and core network 1300-1. A second edge enterprise can own, operate, and/or control the edge infrastructure comprising wireless network 1100-2, fronthaul/backhaul network 1200-2, and core network 1300-2. A third edge enterprise entity can own, operate, and/or control the edge infrastructure comprising wireless network 1100-Z, fronthaul/backhaul network 1200-Z, and core network 1300-Z. Different respective ones of the edge enterprises can be telecommunications network providers which are sometimes referred to as communication service providers (edge enterprise entity CSPs).

In the described embodiment of FIG. 2, the combination of a wireless network and a fronthaul network can define edge network 500 provided by a radio access network (RAN). Edge network 500 can define edge infrastructure. The depicted RANs provide access from UE devices 20A-20Z to respective core networks. In an alternative embodiment, one or more of edge networks 500 can be provided by a content delivery network (CDN).

Each of the different UE devices 20A-20Z can be associated to a different user. A UE device of UE devices 20A-20Z, in one embodiment, can be a computing node device provided by a client computer, e.g., a mobile device, e.g., a smartphone or tablet, a laptop, smartwatch or PC that runs one or more program that facilitates access to services by one or more service provider. A UE device of UE devices 20A-20Z can alternatively be provided by, e.g., an internet of things (IoT) sensing device.

Embodiments herein recognize that hosting service functions on one or more computing node within an edge enterprise entity network 1000 can provide various advantages including latency advantages for speed of service delivery to end users at UE devices 20A-20Z. Edge enterprise entity hosted service functions can be hosted e.g., within an edge network 500 or otherwise within edge enterprise entity network 1000.

In other embodiments that are set forth herein, service delivery application 110 can be provided by an enterprise entity other than an edge enterprise entity. Such a service delivery application 110 can be hosted on MEC platform 100 within a computing environment external to an edge computing environment, e.g., within data network 2000. By running of such a service delivery application 110, the service delivery application 110 can join one or more service capability application developed by an edge enterprise entity and running on a MEC platform 100 within an edge enterprise entity computing environment, e.g., within an edge network.

Data network 2000 can include, e.g., an IP multimedia sub-system (IMS) and/or "the internet" which can be regarded as the network of networks that consist of private, public, academic, business, and government networks of local to global scope linked by a broad array of electronic, wireless, and optical networking technologies. Data network 2000 can include, e.g., a plurality of non-edge data centers. Such data centers can include private enterprise data centers as well as multi-tenancy data centers provided by IT enterprises that provide for hosting of service functions developed by a plurality of different enterprise entities.

MEC environment 10 facilitates collaborations between enterprise entities in the delivery of services to end users. The collaborations can be between edge enterprises and non-edge enterprises, between multiple edge enterprises, or between multiple non-edge enterprises. For build-out of a service delivery application, an edge enterprise entity need not develop each service function to be provided to an end user. Rather, in one example, a service delivery application 110 can be provisioned as an extensible service delivery application. In one embodiment, the extensible service delivery application can be a service delivery application that dynamically joins one or more service capability application during the running of the service delivery application. The joining service delivery application 110 can be hosted either closer to edge end at the end user or farther away from the end user than the service capability application.

Some edge entities that own, operate, and/or control edge infrastructure such as provided by an edge network 500 can offer multi-tenancy hosting services that permit enterprises other than edge enterprises to host their applications on one or more edge node within edge enterprise entity network 1000.

Referring to MEC environment 10 as shown in FIG. 2, MEC environment 10 can include a plurality of MEC platforms 100 distributed throughout MEC environment 10.

MEC platforms 100 can include, e.g., private MEC platforms accessible only by enterprise entities owning, operating, and/or controlling the infrastructure defining the MEC platform or can include publicly accessible multi-tenancy MEC platforms. Publicly accessible MEC platforms of MEC platforms 100 can include, e.g., MEC platforms of edge enterprise entities that own, operate, and/or control edge infrastructure and/or publicly accessible multi-tenancy MEC platforms of IT service providers who own, operate, and/or control infrastructure defining data network 2000.

In the described embodiment of FIG. 2, edge enterprise MEC platforms can include MEC platforms 100 at locations AA, BA, CA, AB, BB, CB, AC, BC, and CC. In one embodiment, the described edge enterprise entity MEC platforms 100 of edge enterprise entity locations AA, BA, CA, AB, BB, CB, AC, BC, and CC can be inaccessible to entities other than the edge enterprise entity providing the MEC platform. However, in some instances, an edge enterprise entity providing a MEC platform 100 within an edge infrastructure defined by edge enterprise entity network 1000 can elect to configure their MEC platform as a multi-tenancy MEC platform to provide access to enterprise entities other than the edge enterprise providing the MEC platform. Access to MEC platform 100 can include, e.g., ability to develop and host service capability applications on the MEC platform and/or to join hosted service capability applications hosted on the MEC platform.

MEC platforms 100 within MEC environment 10 as shown in FIG. 2 can include MEC platforms 100 of data network 2000 which can include the MEC platforms 100 at locations D1, D2, through DZ of data network 2000. According to one embodiment, MEC platforms 100 at locations D1, D2 . . . DZ can be publicly accessible multi-tenancy MEC platforms configured to host service capability applications developed by enterprise entities other than edge enterprise entities (or including edge enterprises who wish to host on the MEC platform). MEC platforms at locations D1, D2 . . . DZ can provide a hosting platform for service function providers who wish to join in the development of delivered services to an end user without investment in edge infrastructure. Enterprise entities other than edge enterprise entities, in some embodiments, can host service delivery applications on MEC platforms 100 at D1, D2 . . . DZ which are configured to be extensible delivery applications that join one or more service capability application hosted on a MEC platform within an edge infrastructure.

In a further aspect with respect to MEC environment 10, the respective MEC platforms 100 can include instances of ledger data structure 120 which can be configured as a shared ledger data structure and which can include one or more ledger. During the deployment period of MEC environment 10, ledger data structure 120 can be shared and be iteratively updated. The updated version of ledger data structure 120 can be iteratively shared between the respective MEC platforms 100 of MEC environment 10. Each respective MEC platform 100 can store an updated version of shared ledger data structure 120 in its respective data repository 108.

Figure 3:
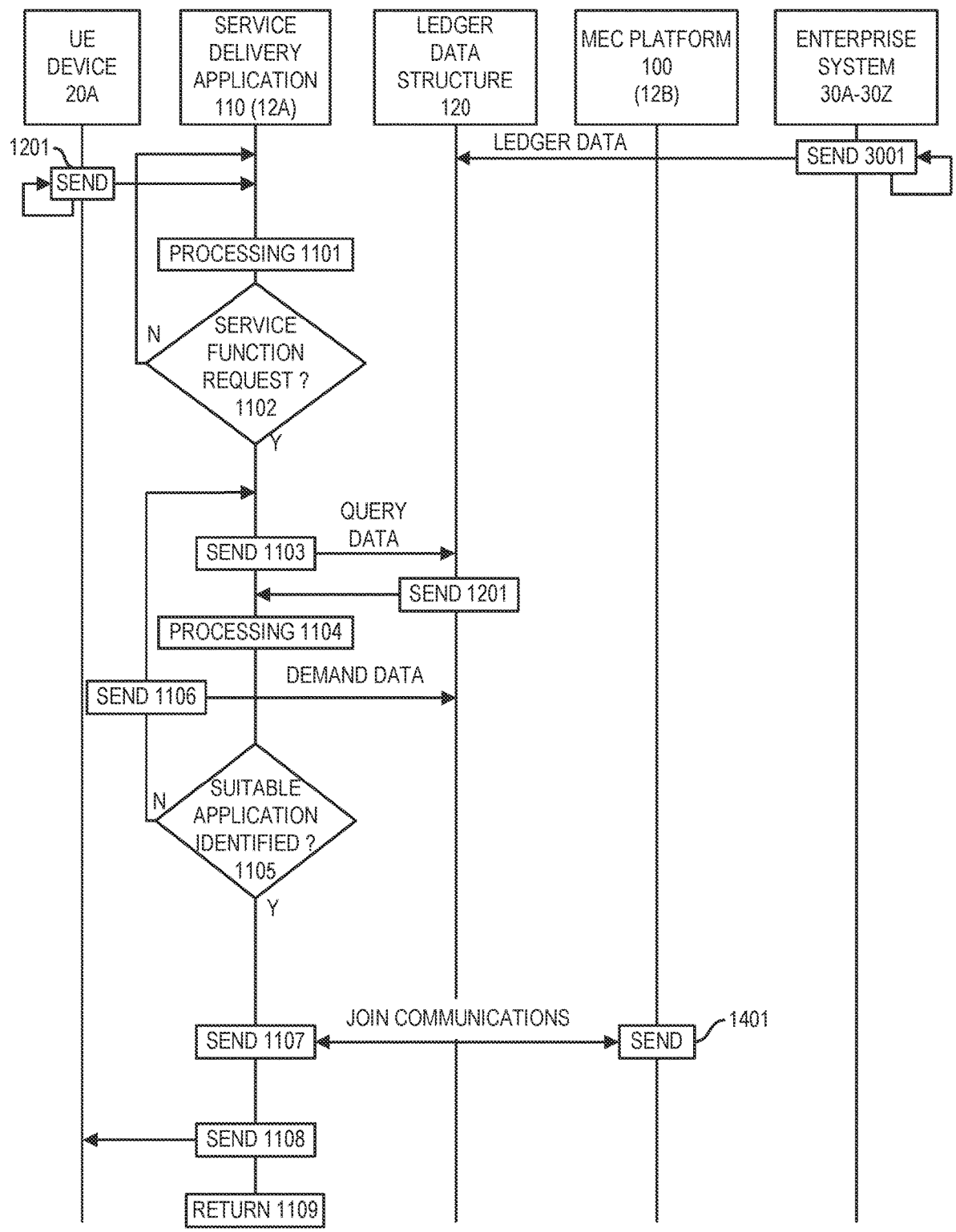
FIG. 3 is a flowchart illustrating performance of a method, according to one embodiment.

A method for performance by service delivery application 110 running on MEC platform 100 of computing environment 12A interoperating with ledger data structure 120, MEC platform 100 of computing environment 12B, enterprise system 30A-30Z, and UE device 20A is described in the flowchart of FIG. 3. In one embodiment, service delivery application 110 hosted on MEC platform 100 of computing environment 12A can be a service delivery application of an edge enterprise entity and computing environment 12A can be provided by one or more computing node of fronthaul/backhaul network 1200-1, i.e., the MEC platform 100 at location BA of FIG. 2.

Figure 4:
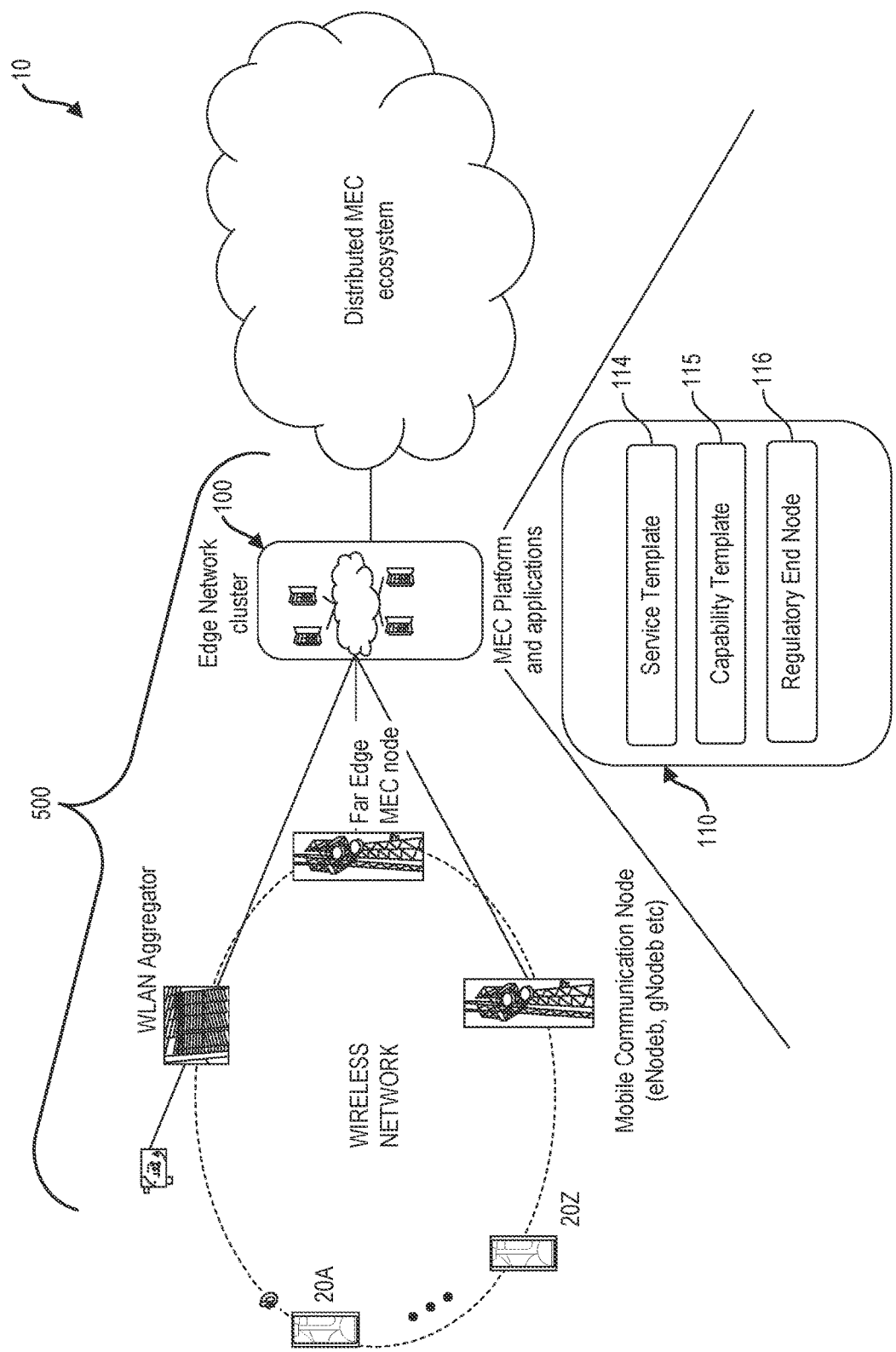
FIG. 4 depicts a MEC environment, according to one embodiment.

According to the network schematic view of FIG. 4, MEC platform 100 of computing environment 12A as shown in FIG. 1 can be provided by an edge network cluster as shown in FIG. 4 which can be provided within a fronthaul/backhaul network 1200-1. In one embodiment, MEC platform 100 of computing environment 12A as shown in FIG. 1 and FIG. 4 can be an edge infrastructure cluster provided by a network aggregation point within a fronthaul/backhaul network 100-1 of edge network 500 provided by a RAN. The MEC platform 100 of computing environment 12A as shown in FIG. 1 can alternatively be provided, e.g., by base station infrastructure of a RAN defining edge network 500, transmission node infrastructure of RAN defining edge network 500, or core network infrastructure of an edge enterprise entity network.

With reference to the flowchart of FIG. 3, MEC platform 100 of computing environment 12B can be a MEC platform 100 at location D1 of data network 2000, in one example. In the described example of FIGS. 1, 3, and 4, computing environment 12B can be farther from an edge end at the end user at UE device 20A than computing environment 12A which can be defied within an edge enterprise entity network 1000 (FIG. 2).

With reference to the flowchart of FIG. 3, service delivery application 110 hosted on MEC platform 100 of computing environment 12A can be provided by telephone call service delivery application. Referring to FIG. 1, the one or more native process 111 of the phone call service delivery application can include, e.g., a number analysis process and a current region end point process for determining a termination end point within a current region of computing environment 12A. Service delivery application 110 as shown in FIG. 1 can be absent of certain additional service functions but can be configured to be extensible so that such additional service functions can be joined to service delivery application 110 by joining a service capability application developed by an external enterprise entity other than the enterprise entity developing service delivery application 110.

Referring to the flowchart of FIG. 3, UE device 20A at block 1201 can be sending a dialed phone number, i.e., a number sequence to service delivery application 110 running on MEC platform 100 of computing environment 12A. In the described example, edge network 500 of the first edge entity described with reference to FIG. 2 can be configured so that the dialed phone call is pushed through processing by MEC platform 100 at location BA as described herein. With further reference to the flowchart of FIG. 3, service delivery application 110 at processing block 1101 can perform processing of the received phone number sequence defined by the dialed phone number. Processing at block 1101 can include performing the one or more native process as described in FIG. 1 and can also include performance of service request monitoring process 112 and service extension process 113 as described in FIG. 1. For performance of service request monitoring process 112, service delivery application 110 can be iteratively updating service template 114 as described in reference to FIG. 4.

Shown in FIG. 4, service delivery application 110 for performance of service request monitoring process 112 can iteratively update service template 114. With performance of service extension process 113, service delivery application 110 can use capability template 115 stored in data repository 108. Service delivery application 110 can also include regulatory end node process 116 for translation of regulatory requirements between end nodes of service regions.

Service template 114 can specify service functions requested by service delivery application 110 configured as an extensible service delivery application. Service template 114 can store associated criterion data that specifies criterion for detecting service function extension request for respective service functions. Service template 114 can specify whether an identified service function is a native function provided by one or more native process 111 or an external function that is not provided by one or more native process. An example service template, according to one embodiment, is illustrated by the decision data structure of Table A.

TABLE A

| Row | Service function ID | Service function | Active/Inactive | Native/External |
|---|---|---|---|---|
| 1 | A001 | Phone number processing | Active | Native |
| 2 | A002 | Current region endpoint | Active | Native |
| 3 | A003 | External region routing | XX | External |
| 4 | A004 | Security level 1 | Active | Native |
| 5 | A005 | Security level 2 | XX | External |
| 6 | A006 | Security level 3 | XX | External |
| 7 | A007 | Video conference | XX | External |

Service delivery application 110 can be configured to iteratively update service template 114 throughout a runtime of service delivery application 110. Referring to the decision data structure of Table A, service template 114 which can be stored in data repository 108 can specify a list of identified functions currently requested by a service delivery application 110 and can also specify whether the requested function is provided by one or more native process 111 or whether the service function is an external function and not a native process. Service template 114 can specify whether an identified service function is active or inactive. An active service function can be a service function currently requested for optimal performance of service delivery application 110. An inactive service function can be a service function currently not required for optimal performance of a service delivery application. Service delivery application 110 can transition a service function from inactive to active on detection of a service extension request for the service function. For performance of service request monitoring process 112, service delivery application can iteratively, during runtime processing of a service delivery application, perform examining criterion data specifying criterion for detecting service function requests, can update inactive/active statuses based on examining, and can examine most recent inactive/active statuses.

Referring again to the flowchart of FIG. 3, service delivery application 110 on completion of processing at block 1101 can proceed to 1102. At block 1102, service delivery application 110 can determine whether a service function extension request has been generated based on the processing of block 1101. Service delivery application 110 can detect a service function extension request in response to examination of application data with reference to criterion data of service template 114 that specifies criterion for detection of a service function extension request. The examined application data can include user defined data. For each external service function specified in service template 114, service delivery application 110 can record in service template 114 criterion data which when satisfied results in a service extension request for the external function being detected. Service delivery application 110 can register a service function extension request when examination of application data indicates that the specified criterion for the external service function has been satisfied to result in the service template 114 as shown in Table A being updated to reflect the active status for the service function.

Service delivery application 110 can iteratively update service template 114 based on examination of application data including user defined data. The user defined data with reference to the described example can include, e.g., the input phone number input by user at block 1201 and as will be explained more fully herein can also include other user defined data, e.g., voice data of a user.

Service delivery application 110 can iteratively perform the loop of blocks 1101 and 1102 until a service function extension request is identified at block 1102. The processing at 1101 can include processing of application data including most recently input data of a user. As shown in Table A, service template 114 can specify various service functions such as number analysis, current region end point, external region routing, level one security, level two security, and level three security. Number analysis and current region end point determination can be specified as being service functions of the one or more native process 111 while remaining functions can be external functions to be performed by an external service capability application.

As noted, service template 114, as shown in Table A, can also specify the active or inactive state of the service function. The state can be transitioned from inactive to active when the request for the service function is identified by the performance of service request monitoring process 112. With reference to the described example of Table A, service delivery application 110 at block 1102 can, on performing of a number analysis of an entered phone number, determine that external region routing is required (service function A001 of Table A) to update the external region routing service function to active. Service delivery application 110 at block 1102 can register the decision that external region routing is required as a service function extension request.

On the identification of the external service function request at block 1102, service delivery application 110 can proceed to block 1103 to query ledger data structure 120 and at block 1104 can perform processing to identify a suitable service capability application for performance of a service function using retuned query data and criterion data of capability template 115. Capability template 115 as shown in FIG. 4 which can be stored in data repository 108 can store criterion data specifying one or more criterion for performance of the external service functions specified in a service template 114 as shown in FIG. 4 and Table A. Capability template 115 having criterion data specifying one or more criterion for respective external service functions associated to service delivery application 110 can be pre-stored in data repository 108. Providing pre-stored capability template 115 can avoid a need to generate criterion data associated to an identified service function extension request during runtime processing of service delivery application 110.

Prior to block 1104 at block 3001, enterprise systems 30A-30Z associated to different enterprises can be sending ledger data to specify new capabilities entries into ledger data structure 120 in a capability ledger thereof. Enterprise systems can be sending ledger data, e.g., by automated processed or by the actions based on user defined data defined by agent users associated to such enterprises. The enterprise entities sending ledger data associated to service capability applications for hosting on MEC platform 100 of computing environment 12B can be enterprises other than edge enterprises and in some use cases can be edge enterprises that wish to expand hosting of their developed service capability applications.

For performance of service extension process 113, service delivery application 110 can perform blocks 1103 to 1107 as set forth herein. At block 1103, service delivery application 110 can send query data for querying ledger data structure 120. The query data sent by service delivery application 110 at block 1103 can include query data for querying ledger data structure 120 to determine whether there is specified in ledger data structure 120 a capabilities record in a capability ledger of ledger data structure 120 that satisfies one or more criterion specified in capability template 115. Capability template 115 can store criterion data specifying one or more criterion for performance of the external service functions specified in a service template 114 as shown in FIG. 4. Service delivery application 110 at block 1104 can process the data returned from the ledger state structure query at block 1103 with criterion data specified in capability template 115 to determine whether there is an existing service capability application specified in ledger data structure 120 suitable for performance of the service function extension request identified at block 1102. At processing block 1104, service delivery application 110 can examine criterion data of capability template 115 in order to determine one or more criterion associated to a service function identified at block 1102. Service delivery application 110 at block 1104 can examine criterion data specified in capability template 115 and capabilities data of a capability ledger of ledger data structure 120 to identify a service capability application of service capability applications 140A-140Z suitable for performance of the service function.

On completion of block 1104, service delivery application 110 can proceed to block 1105. At block 1105, service delivery application 110 can determine whether a suitable service capability application suitable for performance of the service function extension request detected at block 1102 has been identified at block 1104. In one example, service delivery application 110 at block 1105 determines that service capability application 140A hosted on MEC platform 100 of computing environment 12B has been identified as a suitable service capability application. If service delivery application 110 at block 1105 determines that a suitable service capability application has been identified, service delivery application 110 can jump to block 1107 to join the identified service capability application into service delivery application 110.

However, if no qualifying service capability application is identified at block 1105, service delivery application 110 can proceed to block 1106. At block 1106 service delivery application 110 can send demand data to write demand data defining a demand for entry into a demand ledger of ledger data structure 120.

The demand data can specify a demand in accordance with the criterion data of capability template 115 for the identified service function identified at block 1102. The demand data can specify certain timing requirements for satisfaction of the demand. The providing of pre-stored capability template 115 can facilitate the writing of the demand data to ledger data structure 120 without processing delay for the generation of demand data.

Embodiments herein recognize that writing demand data at block 1106 to a demand ledger of ledger data structure 120 can increase the likelihood of a suitable service capability application being identified. For example, MEC environment 10 can be configured so that enterprise entities associated to enterprise systems 30A-30Z can be monitoring ledger data structure 120 with use of automated processes and can be writing new capabilities data to ledger data structure 120 defining entries for new or updated service capability applications responsively to the newly written demand data.

On completion of send block 1107 to write demand data to ledger data structure 120, service delivery application 110 can return to block 1103 to send additional query data to ledger data structure 120 to determine if additional entries have been added to a capability ledger of ledger data structure 120 in response to the demand data written at block 1106. Ledger data structure 120 can send return data to service delivery application 110 at block 1201, and at block 1104 service delivery application 110 can perform another iteration of processing block 1104 using capabilities data of ledger data structure 120 and criterion data of capability template 115 in order to identify a suitable service capability application for performing the identified service extension request identified at block 1102. Service delivery application 110 can iteratively perform the loop of block 1113-1116 until a suitable service capability application is identified.

On the determination that a suitable service capability application has been identified at block 1105, service delivery application 110 can proceed to block 1107. At block 1107, service delivery application 110 can join the identified service capability application determined to be identified at block 1105. Joining of a service capability application can include sending join communications. At blocks 1107 and 1401, service delivery application 110 can send join communications to join the identified service capability application identified by the processing of block 1104, and the identified service capability application can send return join communications. The join communications from service delivery application 110 of MEC platform 100 of computing environment 12A can be sent to MEC platform 100 of computing environment 12B where the identified service capability application is located. The service delivery application 110 and the identified service capability application joined to a service delivery application can communicate with one another through appropriate application programming interfaces (APIs). Join communications can include messages provided by processing requests from service delivery application 110 to an identified service capability application and return data.

Hosting of service capability applications 140A-140Z can include miming of service capability applications 140A-140Z on one or more computing node of MEC platform 100 of computing environment B. Hosting of service capability applications 140A-140Z can additionally or alternatively include storing in a storage memory of MEC platform 100 program images that can be instantiated to activate runtime instances of service capability applications 140A-140Z. According to one scenario, images of the program images can be instantiated locally on MEC platform 100 of computing environment 12B. In another scenario, images of the program images can be pulled by service delivery application 110 running in MEC platform 100 for instantiation on MEC platform 100 of computing environment 12A. According to such a scenario, join communications at blocks 1107 and 1401 can include join communications so that a program image for instantiation of a runtime instance of a service capability application is pulled to MEC platform 100 of computing environment 12A. A program image can include a program image to instantiate a virtual machine for running a service capability application. A virtual machine can include, e.g., hypervisor-based virtual machine or a container-based virtual machine.

In the described embodiment, the identified service capability application satisfying an identified external service function of service delivery application can be hosted on MEC platform 100 of computing environment 12B, but based on the data of the ledger data structure 120 could have easily been located on another MEC platform within MEC environment 10 as shown in FIG. 2.

In the described example, the identified external service function A001 can be an external service function for external region routing and a service capability application located on MEC platform 100 of computing environment 12B has been identified as a service capability application capable of performing the identified service function. In the described embodiment, the identified service capability application 140A of MEC platform 100 of computing environment 10B, by the depicted join communications, can send external region routing data to service delivery application 110. Service delivery application 110 in turn can use the external region routing data for identification of a path to the call recipient at another UE device and at block 1108 can send user defined data of the other user, e.g., voice data, to UE device 20A. At block 1109, service delivery application 110 can return to a processing stage prior to processing block 1101.

Continuing with the phone call example, service delivery application 110 can be iteratively performing the loop of blocks 1101-1109 until the phone call is terminated. For performance of service request monitoring process 112, service delivery application 110 can be monitoring voice data of the user of UE device 20A or the other user receiving the call through the phone call session. Service delivery application 110 can be processing voice data using speech to text conversion and can subject the text to natural language processing to identify topics specified within the voice data. The topics can include general topics and/or specific topics such as keyword topics.

It has been described that service delivery application 110 running service request monitoring process 112 can include service delivery application 110 performing number analysis to determine that external region routing is required. In another example, service delivery application 110 running service request monitoring process 112 can include service delivery application 110 monitoring application data for topics that can trigger an increased security level associated to the conversation. The monitoring can include converting speech to text using speech to text conversion and subjecting converted text to natural language processing for topic extraction. In one example, if sensitive topics such as investments or healthcare are detected, a security level associated to the conversation might be increased by service delivery application 110. Referring to service template 114 described in reference to Table A, service delivery application 110 can activate security level 2 or security level 3 (Rows 6 and 7) depending on topics identified dynamically during the phone call session. Security level 2 can be associated to security features that are increased relative to security level 1 and security level 3 can be associated to security features increased relative to security level 2. Using a mapping decision data structure stored in data repository 108 of MEC platform 100 of computing environment 12A, different topics can be mapped to different service function extension requests mapping to different security levels. For example, topics relating to sports and entertainment can map to security level 1. Topics relating to household purchases can map to security level 2, and topics relating to investments and personal healthcare can map to security level 3.

In the performance of the loop of blocks 1101 to 1109, service delivery application 110 at block 1102 dynamically, in dependence on topics extracted from voice conversation data, can determine that a service function extension request has been detected based on a topic flow of a current conversation. Responsively to the detection of a service function extension request in the manner described previously in reference to blocks 1103 to 1109, service delivery application 110 can query ledger data structure 120 and/or launch a demand entry on a demand ledger of ledger data structure 120 so that a qualifying service capability application can be identified.

On the identification of a suitable service capability application at processing block 1104 capable of performing the specified service function, e.g., associated with service security level 2 or security level 3, service delivery application 110 can send join communications to the identified service capability application, e.g., service capability application 140Z located on MEC platform 100 of computing environment 12B (the qualifying service capability application could alternatively be on another computing environment). The identified service capability application can send reciprocal join communications (block 1401) to service delivery application 110 so that the identified service capability application is joined to the service delivery application 110. At send block 1108, service delivery application 110 can continue to send other user voice data to UE device 20A which has been processed using the security processing functions of service capability application 140Z.

Continuing with the example of a voice call described with reference to the flowchart of FIG. 3, service delivery application 110 running service request monitoring process 112 can detect whether a service function extension request has been detected to transition the current voice call into a video conference call. For such functionality, service template 114 as shown in Table A can include Row 7 specifying the external service function of a video conference. For determining whether to transition a current voice call into a video conference, service delivery application 110 can monitor, with reference to criterion data for detection of a video conference service function extension request, return data extracted from voice conversation data with use of natural language processing of voice data converted into text data by a speech to text converter.

Service delivery application 110 can identify at block 1102 that a service function request has been received on the detection of topics including key word-based topics that indicate that transitioning to a video conference call can improve the quality of communication between participant users of the current voice call. Example topics can include topics that indicate that an object having certain visible physical characteristics is being described. Keyword topics can include keyword topics such as "show" and "demonstrate" and "looks like". On the detection of a transition to video conference, service delivery application 110 can update the video voice call service feature of service template 114 of Table A to active, proceed to block 1102 to access data from ledger data structure 120, and perform processing block 1104 to examine returned ledger data specifying capabilities data of service capability applications to capability template data of capability template 115 specifying one or more criterion for performance of the video conference call service function.

Service delivery application 110 can perform blocks 1104 to 1108 in the manner described previously initially to search for qualifying service capability applications amongst participating MEC platforms 100 and of MEC environment 10 as shown in FIG. 2. If, on the condition that no qualifying service capability application is identified during an initial query of capabilities data of ledger data structure 120, service delivery application 110, to encourage additional capabilities data entry into ledger data structure 120, can proceed to write demand data defining a demand ledger entry to ledger data structure 120 in order to register a demand for a service capability application for providing the video voice function. In the described scenario, service delivery application 110 can identify the qualifying service capability application as service capability application 140A of MEC platform 100 within computing environment 12A, i.e., in the described scenario, the service capability application 140A of computing environment 12A can be collocated on the common MEC platform 100 with service delivery application 110 within computing environment 12A. As described in in one embodiment, MEC platform 100 of computing environment 12A can be a multi-tenancy MEC platform of an edge enterprise entity that permits hosting of service capability applications developed by enterprise entities other than the edge enterprise entity owning, operating, and/or controlling MEC platform 100 of computing environment 12A.

In another scenario, the identified service capability application for providing the video voice call function can be located on MEC platform 100 external to MEC platform 100 within computing environment 12A hosting service delivery application 110, e.g., can be on MEC platform 100 of a computing environment within an edge network associated to an edge entity other that the edge entity that owns, operates, and/or controls MEC platform 100 of computing environment 12A.

In the described scenario where the service capability application for providing the video voice call functionality is located in an edge network of an edge enterprise entity other than the edge enterprise entity of MEC platform 100 hosting service delivery application 110, interfacing functionality with the user of UE device 20A for the video conference call portion of the call session can be handed off to the MEC platform 100 of the different edge network 500 with application status data returned to service delivery application 110 for monitoring. When the conditions giving rise to the preference for video conference call are no longer prevailing, interfacing control of the call session can be returned to MEC platform 100 of computing environment 12A hosting service delivery application 110.

In the described scenario where the service capability application is a service capability application for providing video conference call functionality, the service capability application can be located on a MEC platform 100 closer to the edge end at UE device 20A than computing environment 12A. For example, where computing environment 12A is located within fronthaul/backhaul network 1200-1 as shown in FIG. 2, the service capability application for providing the video conference call functionality can conceivably be provided by MEC platform 100 at base station location AB within wireless network 1100-3 shown in FIG. 2, i.e., within edge infrastructure owned, operated, and/or controlled by an edge enterprise entity other than the edge enterprise entity providing MEC platform 100 at location BA.

Another embodiment in which the service delivery application 110 communicates with a service capability application hosted closer to an edge end at UE device 10A than service delivery application 110 is described in connection with FIG. 5 and the flowchart of FIG. 6.

Figure 5:
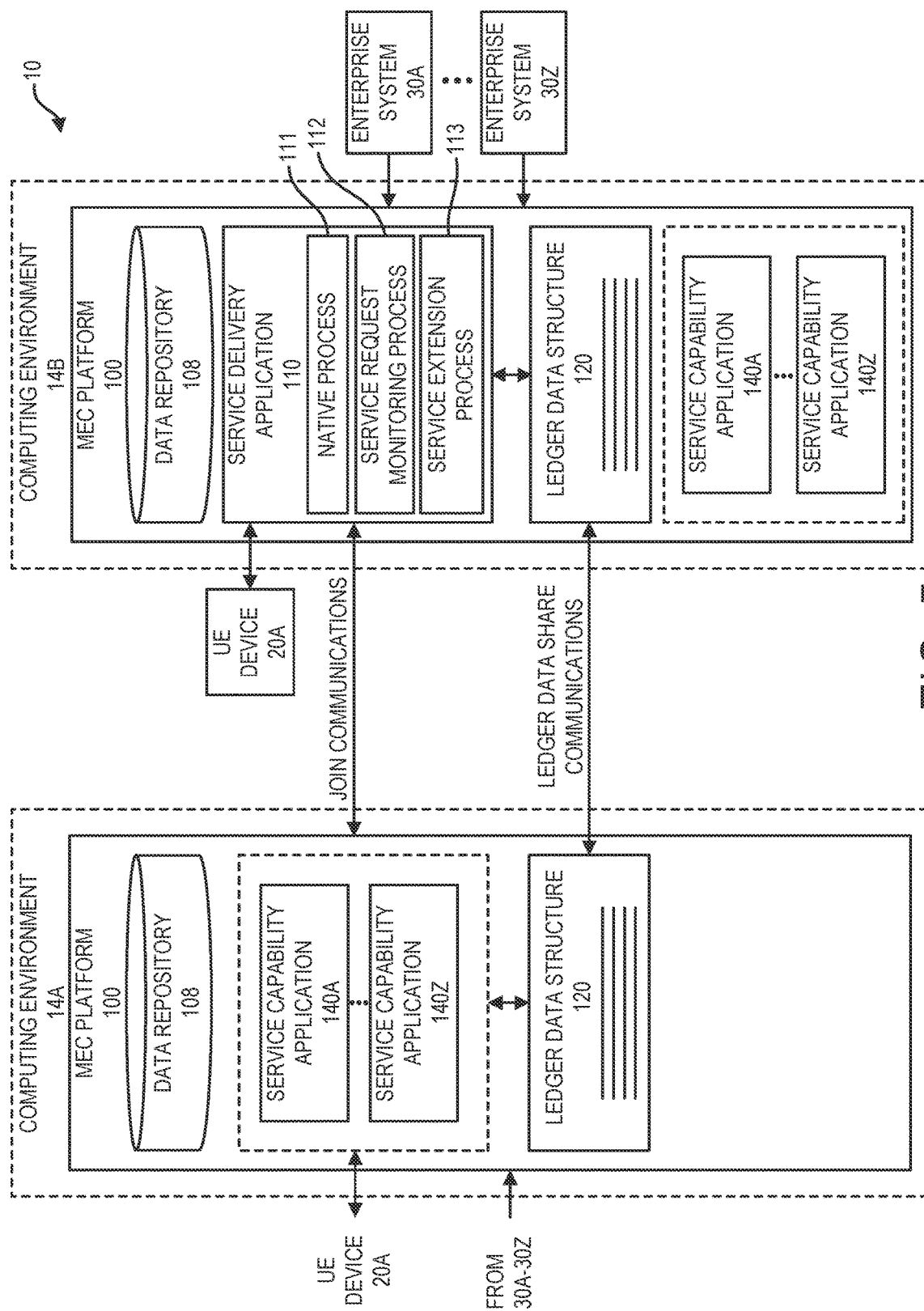
FIG. 5 depicts a MEC environment, according to one embodiment.

In the use case depicted in FIG. 5, service delivery application 110 can be hosted on MEC platform 100 of computing environment 14B and can join with a service capability application 140A hosted on MEC platform 100 of computing environment 14A. According to one embodiment, with reference to the use case of FIGS. 5 and 6, computing environment 14A hosting joined service capability application 140A can be located closer to the edge end at UE device 20A than computing environment 14B hosting and running service delivery application 110, and computing environment 14B can be farther from the edge end than computing environment 14A.

Computing environment 14A can be provided, for example, by a computing environment of edge enterprise entity network 1000 of the edge enterprise entity associated to wireless network 1100-1, fronthaul/backhaul network 1200-1, and core network 1300-1. In a particular example with reference to FIG. 2, MEC platform 100 of computing environment 14B, hosting service delivery application 110 can be provided by MEC platform 100 at location D2 within data network 2000, and MEC platform 100 of computing environment 14A hosting joined service capability application 140A of computing environment 14A can be provided by MEC platform 100 at location BB within fronthaul/backhaul network 1200-2.

Figure 6:
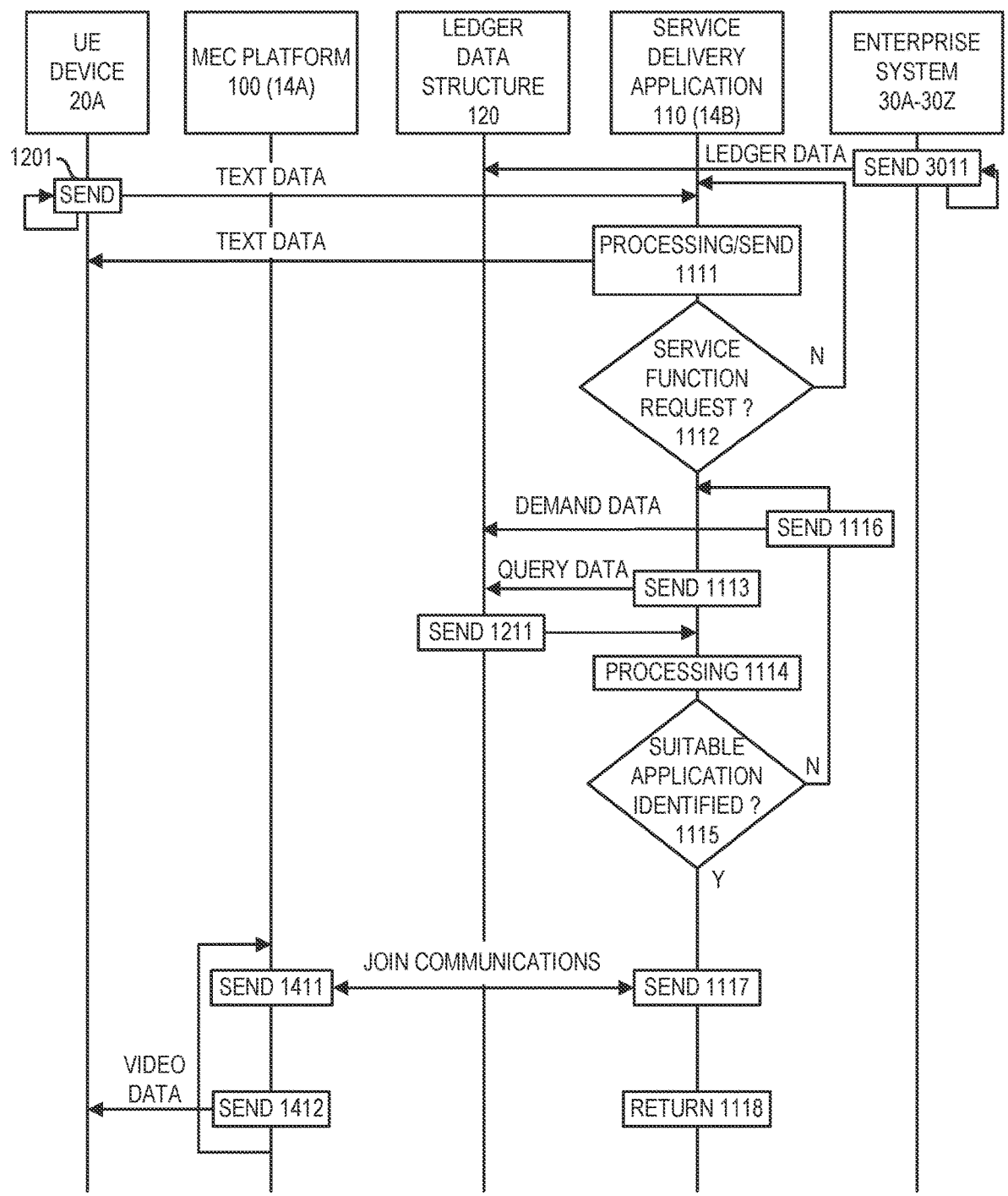
FIG. 6 is a flowchart illustrating performance of a method, according to one embodiment.

In the described embodiment of FIG. 5 and FIG. 6, UE device 20A initially can communicate and interface with MEC platform 100 of computing environment 14B, and, dynamically during a communication session interfacing control for providing interfacing to an end user, can be transitioned to MEC platform 100 of computing environment 14A. In the described scenario, computing environment 14B can be provided by data network 2000. In one scenario, MEC platform 100 of computing environment 12B can be MEC platform 100 at location D2 of data network 2000 (FIG. 2).

FIG. 6 is a flowchart illustrating a method for use with the MEC environment 10 depicted in FIG. 5. In the described scenario of the flowchart of FIG. 6, service delivery application 110 running on MEC platform 100 of computing environment 14B provided by data network 2000 can be running a chatbot application in which user of UE device 20A can be provided with chatbot-based customer service port displayed as a displayed user interface on a display of UE device 20A.

Service delivery application 110 can run native process 111 to provide chatbot service functioning, as well as service request monitoring process 112, and service extension process 113. Service delivery application 110 running native process 111 can include service delivery application 110 providing baseline chatbot services in which service delivery application using a variety of decision trees can examine text defined by user to determine topics and sentiments therefrom using natural language processing and, based on extracted topics and sentiment, can provide returned chatbot text to the user. Service delivery application 110 running service request monitoring process 112 can monitor the current communication session for data indicating that a service function extension defined by a transition to a high-resolution video presentation has been requested.

For such processing, service delivery application 110 can subject user defined text of a chatbot session to natural language processing to extract topics therefrom including topics mapping keyword topics. Service delivery application 110 can monitor for certain topics indicating a request for a video presentation, e.g., extracted topics such as "video presentation," "training video," and the like. Service delivery application 110 can employ an associated service template 114, capability template 115, and regulatory end node process 116 as explained with reference to FIG. 4. Service template 114 associated to the described service delivery application 110 referenced in FIG. 5 can be provided as shown in Table B.

TABLE B

| Row | Service function ID | Service function | Active/Inactive | Native/External |
|---|---|---|---|---|
| 1 | B001 | Chatbot | Active | Native |
| 2 | B002 | High resolution video | XX | External |

Service delivery application 110, as described in the use case of FIGS. 5 and 6, can include a chatbot function as a native service function of service delivery application 110. Service delivery application 110, according to service template 114, can include the external service function of high-resolution video presentation. In the described scenario, service delivery application 110 can be augmented with a dynamically triggered high-resolution video presentation function based on one or more criterion being satisfied. Service template 114 can store criterion data associated to the high-resolution video presentation service function that specifies one or more criterion for detection of a high-resolution video presentation service function extension request. In another aspect, the high-resolution video presentation function, for reduced latency, can be advantageously hosted on MEC platform 100 disposed within an edge network 500, FIG. 2.

Referring to the flowchart of FIG. 6, service delivery application 110 running on MEC platform 100 of computing environment 14B at block 1111 can be performing various processing including sending chatbot text data in response to the user defined text data sent at block 1201. At block 1112, service delivery application 110 can determine that a service function request has been generated for transitioning to a high-resolution video presentation within the service support session. For a time that the service function request is not identified at block 1112, service delivery application 110 can iteratively perform the loop of blocks 1111 and 1112 until the time that service function request is identified at block 1112. When a service function extension request is identified at block 1112, service delivery application 110 can proceed to block 1113 for querying capabilities data from ledger data structure 120.

At processing block 1114, service delivery application 110 can process the data returned from the ledger data structure query at block 1113 with criterion data specified in capability template 115 to determine whether there is an existing service capability application specified in ledger data structure 120 suitable for performance of the service function extension request identified at block 1112. At block 1115, service delivery application 110 can determine whether based on the processing of block 1114 a suitable service capability application for performance of the service function extension request detected at block 1112 has been identified. If service delivery application 110 at block 1115 determines that a suitable service capability application has been identified, service delivery application 110 can jump to block 1117 to join the identified service capability application into service delivery application 110.

However, if no qualifying service capability application is identified at block 1115, service delivery application 110 can proceed to block 1116. At block 1116, service delivery application 110 can send demand data to ledger data structure 120 in order to write demand data defining a demand for entry into a demand ledger of ledger data structure 120.

The demand data can specify a demand in accordance with the criterion data of capability template 115 for the identified service function identified at block 1112. The demand data can specify certain timing requirements for satisfaction of the demand. The providing of pre-stored capability template 115 can facilitate the writing of the demand data to ledger data structure 120 without processing delay for the generation of demand data.

Embodiments herein recognize that writing demand data at block 1116 to a demand ledger of ledger data structure 120 can increase the likelihood of a suitable service capability application being identified. For example, MEC environment 10 can be configured so that enterprise entities associated to enterprise systems 30A-30Z can be monitoring ledger data structure with use of automated processes and can be writing new capabilities data defining entries for new or existing service capability applications responsively to the newly written demand data.

On completion of send block 1116 to write demand data to ledger data structure 120, service delivery application 110 can return to block 1113 to send additional query data to ledger data structure 120 to determine if an additional entry satisfying the demand data has been added to a capability ledger of ledger data structure 120 in response to the demand data written at block 1116. Ledger data structure 120 can send return data to service delivery application at block 1211, and at block 1114, service delivery application 110 can perform another iteration of processing block 1114 using capabilities data of ledger data structure 120 and criterion data of capability template 115 in order to identify a suitable service capability application for performing the identified service extension request identified at block 1112. Service delivery application 110 can iteratively perform the loop of blocks 1113-1116 until a suitable service capability application is determined to be identified at block 1115.

On the determination that a suitable service capability application has been identified at block 1115, service delivery application 110 can proceed to block 1117. At block 1117, service delivery application 110 can join the identified service capability application determined to be identified at block 1115. Joining of a service capability application can include sending join communications. At blocks 1117 and 1411, service delivery application 110 can send join communications to join the identified service capability application identified by the processing of block 1114. The join communications from service delivery application 110 of MEC platform 100 of computing environment 14B can be sent to MEC platform 100 of computing environment 14A where the identified service capability application is located. At blocks 1117 and 1411, service delivery application 110 and MEC platform 100 running on computing environment 14B can be sending appropriate join communications so that service delivery application 110 can join the service capability application miming on MEC platform 100 of computing environment 12A into service delivery application 110. The service delivery application 110 and the identified service capability application joined to service delivery application can communicate with one another through appropriate application programming interfaces (APIs). Join communications can include messages provided by processing requests from service delivery application 110 to an identified service capability application and return data. At return block 1118 on completion of the high resolution video session, service delivery application 110 can return to a stage prior to block 1111, and can iteratively preform the loop of blocks 1111 and 1112 until a next service function request is detected at block 1112.

As a result of the join communications at blocks 1117 and 1411 in the described scenario, interfacing to the end user at UE device 20A can transition for the time of the high-resolution video presentation to MEC platform 100 running in computing environment 14A which service capability application can be running the selected service capability application 140A for providing the high-resolution video presentation functionality. At block 1412, MEC platform 100 of computing environment 14A in the described scenario of FIGS. 5 and 6 can be sending high resolution video to UE device 20A defining a high-resolution video session within the communication service support session. In the performance of the video presentation data, the service capability application 140A of computing environment 14A providing the high-resolution video presentation can be generating status data returned via the described join communications to service delivery application 110. Service delivery application 110 while iteratively performing the loop of blocks 1111 to 1118 can transition the active status flag associated to the video presentation within service template 114 (Table B) when the high resolution video presentation has ended and service delivery application 110 can responsively appropriately return to the loop defined by block 1111 and 1112 to resume the service support session via chatbot text functionality.

In the described scenario described with reference to FIG. 5 and FIG. 6, enterprise system 30A-30Z at block 3011 can be sending ledger data defining capability entries associated to new service capability applications for hosting on various MEC platforms of MEC environment 10 as shown in FIG. 2. In the described scenario described with reference to FIGS. 5 and 6, MEC platform 100 located within computing environment 14A can be configured to host service capability applications developed by enterprise system 30A-30Z. Enterprise systems 30A-30Z can be associated to enterprises that include the edge enterprise associated to MEC platform 100, i.e., that owns, operates, and/or controls the infrastructure defining MEC platform 100 and can include enterprises other than edge enterprises.

Embodiments herein provide a system and method to allow edge enterprise entity CSPs to move away from building all communication service functionalities in their network to provide any service feature to subscriber end users. Embodiments herein recognize that communication services are changing rapidly and edge enterprise entity CSPs are finding it difficult to recover full return on investment before they invest further in building new capabilities. Embodiments herein can facilitate lean edge enterprise entity CSPs. Instead of being responsible for end-to-end service functionality, edge enterprise entity CSPs by use of features herein can focus on last mile service delivery and enhancing customer experience. Embodiments herein can facilitate edge enterprise entity CSPs handing over major parts of service delivery to external enterprise entities. Embodiments herein can facilitate edge enterprise entity CSPs handing over major parts of service delivery with use of examining capabilities data of a ledger data structure and with use of registering a demand to ledger data structure 120. MEC environment 10 can work in real time to provide new and innovative service capabilities that edge enterprise entity CSPs can use to provide any service demanded by their customer user through use of ledger data structure 120 which ledger data structure 120 can leverage Blockchain technology.

Embodiments herein can enable edge enterprise entity CSPs to provide any logically relevant service demanded by its subscribers. Embodiments herein recognize that it can consume substantial time and investment for an edge enterprise entity CSP to build a new service and therefore either subscriber user turns to a competitor or remains deprived of any innovative service that an edge enterprise entity CSP can natively offer on its network. Embodiments herein provide a distributed capability ecosystem where any service capability can be hosted, and all hosted capability services are available to all relevant edge enterprise entity CSPs in free and fair market format through free demand and supply. Moreover, an enterprise entity other than an edge enterprise entity that has a communication service idea can build the capability and host a service capability application on any available MEC platform 100.

The hosting of a service capability application emulates hosting a website or portal on a webserver. Once a service capability application is hosted successfully on a MEC platform 100, then its capabilities can be used from any part of the world and any edge enterprise entity CSP can offer the new service incorporating the service functions of the service capability application in near real time.

Embodiments herein recognize that traditionally, edge enterprise entity CSPs consume high investment to build capabilities that consume significant time and effort. Accordingly, participating in delivery of services to end users can be substantially limited to enterprise entities that can arrange a large amount of investment. It creates a major disadvantage for edge enterprise entity CSPs that have little investment capacity but viable service ideas. Embodiments herein break this barrier by allowing anyone to consume any capability that is offered as a service or API enabled application in a MEC capability network. Embodiments herein can employ a ledger data structure, e.g., Blockchain and MEC to provide a new approach for communication service delivery.

Embodiments herein recognize that communication networks have seen rapid evolution from overhead galvanized iron wire-based service delivery to ultra-high bandwidth mobile network. Embodiments herein can provide dynamic, shared and agile service delivery. Embodiments herein can create an ecosystem of connected capabilities that can deliver any type of service on demand basis through collective efforts from all actors. Embodiments herein provide a mechanism to enable complete communication service in efficient manner through stitching micro/macro services offered by individual MEC platform-based applications in independent and autonomous fashion.

Embodiments herein can employ a shared ledger data structure to share the decision-making attributes and fulfil accounting needs. MEC platform-based applications offer any capability or group of capabilities that is relevant for a communication service. Enterprise entities providing MEC platform-based applications can share the capability information, cost of capability, demand and capacity, availability, quality parameters, security compliance and operating characteristics with each other through a capability ledger of ledger data structure 120.

In one aspect, a capability ledger of ledger data structure 120 can include a supply ledger where enterprise entities providing service capability applications can advertise availability of capabilities that they offer. Ledger data structure 120 can include a demand ledger that floats in network and has information about demand for a capability. When a service function extension request is initiated, the demand ledger can capture the request and share the request with all MEC platforms 100 of MEC environment 10. A MEC platform-based application that is most suitable then captures the demand request and fulfils.

Ledger data structure 120 can include a financial ledger that can be updated with each successful demand fulfilment. The financial ledger can alleviate innovative and creative service owners from providing direct contract/relationship with communication service providers.

Enterprise entities including enterprise entities other than edge enterprise entities can expose capability in distributed ecosystem after security, privacy, data and inter-operability validation though standardized APIs/services. MEC environment 10 can be configured to: (a) work in a distributed architecture; (b) implement and publish capabilities in the form of a service; (c) expose capability through a standardized API/service; (d) consume capabilities offered by other MEC platform based applications in distributed architecture through standardized API/service; (e) adopt Standardized architecture and work on common principles of co-existence; and (f) obtain certification for security, privacy and accuracy.

It has been described with reference to FIGS. 1-6 that service delivery application 110 can dynamically, during runtime of the service delivery application, detect service function extension requests via processing of application data and can, in response to the examination of the application data, identify and join one or more service capability application to the service delivery application for providing the requested service function extension request.

In other use cases, service delivery application 110 can be configured so that one or more service capability application is joined to a service delivery application prior to runtime of the service delivery application. According to one embodiment, service delivery application 110 can be configured so that one or more service capability application joined to the service delivery application can be joined prior to runtime of the service delivery application.

Figure 7:
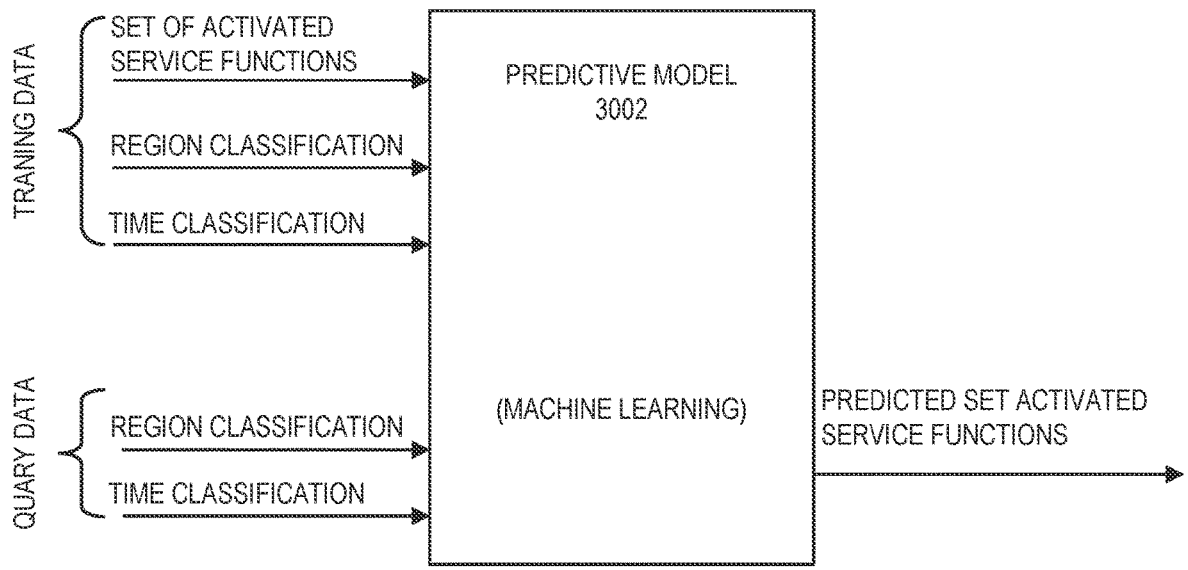
FIG. 7 depicts a predictive model, according to one embodiment.

According to one embodiment, a MEC platform 100 hosting service delivery application 110 can be configured to predict one or more service capability application to be joined to a service delivery application prior to runtime of the service delivery application and can responsively join one or more service capability application to the service delivery application prior to runtime of the service delivery application. FIG. 7 illustrates predictive model 3002 for predicting a set of activated service functions and therefore a set of service capability applications to be associated to a service delivery application prior to runtime of the service delivery application. Predicting a set of activated service functions associated to a service delivery application prior to runtime can facilitate joining a set of service capability applications to the service delivery application prior to runtime of the service delivery application. Joining a service capability application to a service delivery application prior to runtime of the service delivery application can increase response time of the service delivery application.

Referring to FIG. 7, predictive model 3002 can be trained with training data and once trained with training data can be responsive to query data. Predictive model 3002 can be trained with use of iteratively applied training datasets. Each training dataset for training predictive model 3002 can include (a) a set of activated service functions associated to an historical session of a certain service delivery application; (b) a region classification for the historical session of (a); and (c) a time classification for the session of (a). Embodiments herein recognize that by training predictive model 3002 with training datasets that specify a set of activated service functions associated to prior sessions of a certain service delivery application together with a region classification and time classification, predictive model 3002 can learn the relationship between a region, a time, and a set of activated service functions for a certain service delivery application.

Predictive model 3002, once trained, can be responsive to query data. Query data for querying predictive model 3002 can include the dataset of (i) region classification, in combination with (ii) time classification. Predictive model 3002, in response to the applied query data, can output a prediction that specifies a predicted set of activated service functions, prior to runtime, of a certain service delivery application. A MEC platform 100 hosting the certain service delivery application can query predictive model 3002 in order to ascertain a predicted set of activated service functions associated to a service delivery application. The MEC platform 100 prior to runtime of the certain service delivery application can identify with use of ledger data structure 120 and processes described in connection with FIGS. 3 and 5 suitable service capability applications associated with a predicted set of activated service functions and can join the identified service capability applications to the service delivery application prior to runtime. Joining an identified suitable service capability application to a service delivery application prior to runtime can include updating capability template 115 of service delivery application 110 to include a reference to the identified service capability application registered in ledger data structure 120. Service delivery application 110 can use the service capability reference in the capability template to send join communications to the identified service capability application in runtime.

Referring to predictive model 3004, embodiments herein recognize that response time of a service delivery application 110 can be improved where MEC platform 100 hosting the service delivery application 110 can predict service function extension requests prior to the time that they occur and proactively identify a service capability application associated to a predicted service function extension request. Predicting of service function extension requests permits proactive joining of service capability applications and reduced latency.

With use of predictive model 3004, MEC platform 100 hosting a certain service delivery application 110 can predict during runtime of the service delivery application 110 a service function extension request and can proactively join a service capability application in response to the predicting the service function extension request.

Embodiments herein recognize that service functions that are activated during runtime of a certain service delivery application can be predicted using historical data that defines trends in usage of a service delivery application. For example, using historical trend data, it might be determined, e.g., that a second service function is likely to be activated if a first service function has been previously activated. Further, according to a detected trend, it might be determined, e.g., that a third service function is likely to be activated if and when the first and second service functions have been previously activated.

Figure 8:
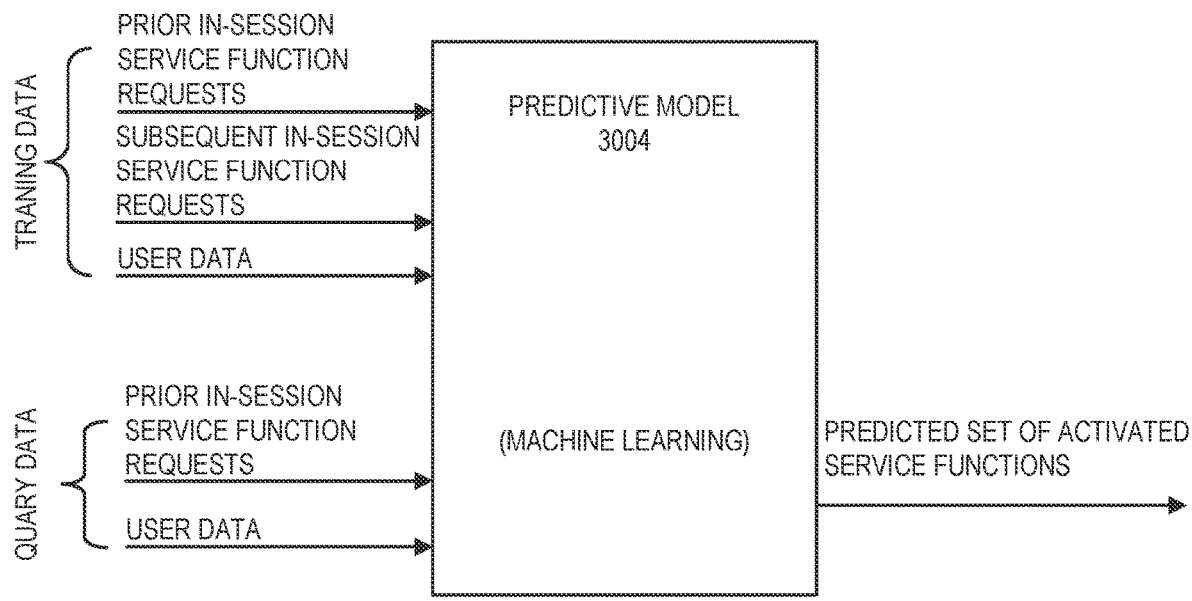
FIG. 8 depicts a predictive model, according to one embodiment.

Predictive model 3004 shown in FIG. 8 can be trained to predict service function activation trends based on prior service function activations within a runtime session of a service delivery application. Predictive model 3004 can be trained with training data and once trained can be responsive to query data. Training data for training predictive model 3004 can include iteratively applied training datasets, each training dataset associated to a certain historical runtime session. According to one embodiment, a training dataset for training predictive model 3004 can include (a) identifiers for prior in-session service function requests; (b) identifiers for subsequent in-session service function requests; and (c) user data. Thus, a training dataset for a prior historical session in which service functions C, J, and A were activated in that order can include the following: training=[0,CJA;C,JA;CJ, A]. The user data for training predictive model 3004 can include e.g., a user identifier or user classification, e.g., based on detected current sentiment of the user as may be determined by natural language processing and/or professional classification of the user. Predictive model 3004, once trained, can be responsive to query data. Query data for querying predictive model 3004 can include the combination of (i) a set of prior in-session service function requests for the current session in combination with (ii) user data for the user in the current session. Predictive model 3004, when queried with the described query data can output a predicted set of subsequent activated service functions for the current session.

During runtime of a certain currently running service delivery application, MEC platform 100 running the certain currently running service delivery application can iteratively query predictive model 3004 in order to return predictions as to subsequent service functions predicted to be activated during the current session. Configured as described, MEC platform 100 hosting the current service delivery application can proactively join a service delivery application in response to a returned prediction predicting that the certain service function is likely to be activated during a current session associated to a running service delivery application. Thus, at the time of activation of a certain service function, a service capability application for performing the service function can have already been identified and joined to a currently running service delivery application. According to one embodiment, the decision to proactively join a certain service capability application to a certain service delivery application can be filtered based on additional factors in addition to the predicted likelihood that the service delivery function will be activated.

Various available tools, libraries, and/or services can be utilized for implementation of predictive model 3002 and/or predictive model 3004. For example, a machine learning service can provide access to libraries and executable code for support of machine learning functions. A machine learning service can provide access set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. Predictive model 3002 and predictive model 3004 can employ use of, e.g., neural networks (NN), support vector machines (SVM), Bayesian networks, linear regression, Holt-Winter, ARIMA, Fourier curve fitting, random forest, and/or other machine learning technologies.

MEC platform 100 hosting a service delivery application can apply Eq. 1 for determining whether to proactively join a certain service capability application associated to a predicted service function predicted to be activated.

$$S = F1 \cdot W1 + F2 \cdot W2 + F3 \cdot W3 \qquad \text{(Eq. 1)}$$

Referring to Eq. 1, factors F1, F2, and F3 can be first, second and third factors associated to a decision to proactively join a certain service capability application, W1, W2, and W3 are weights associated to the factors F1, F2, and F3 and S is an overall scoring value based on the various factors and weights. The factor F1 can be the predicted likelihood factor, i.e., the returned likelihood returned from predictive model 3002 or predictive model 3004 indicating the likelihood that a certain service function will be activated during a runtime session associated to a certain service delivery application. Predictive model 3002 and predictive model 3004 can be configured to output with their prediction confidence levels indicating a likelihood that a certain service function will be activated. With further reference to Eq. 1, factor F2 can be an availability factor. MEC platform 100 hosting a certain service delivery application can assign scoring values under factor F1 for an identified service capability application in proportion to the predicted likelihood that its associated service function will be activated. MEC platform 100 hosting a certain service delivery application in response to a returned prediction that a certain service function will be activated can query ledger data structure 120 to determine a level of availability associated to a certain service capability application. MEC platform 100 hosting a certain service delivery application can assign scoring values under factor F2 in dependence on the expected availability of a certain service capability application. Factor F3 can be a cost factor. MEC platform 100 hosting a certain service delivery application can examine data of ledger data structure 120 to determine an expected cost associated to an identified service capability application and can assign scoring values under factor F3 in dependence on the returned cost. MEC platform 100 hosting a certain service delivery application can score certain identified service capability applications using Eq. 1 and can decide to join the identified service capability application based on the scoring value exceeding a threshold, e.g., a predetermined or dynamically determined threshold. Joining an identified service capability application, can include, e.g., adding a reference to the identified service capability application in capability template 115, and/or sending join communications as set forth herein.

Figure 9:
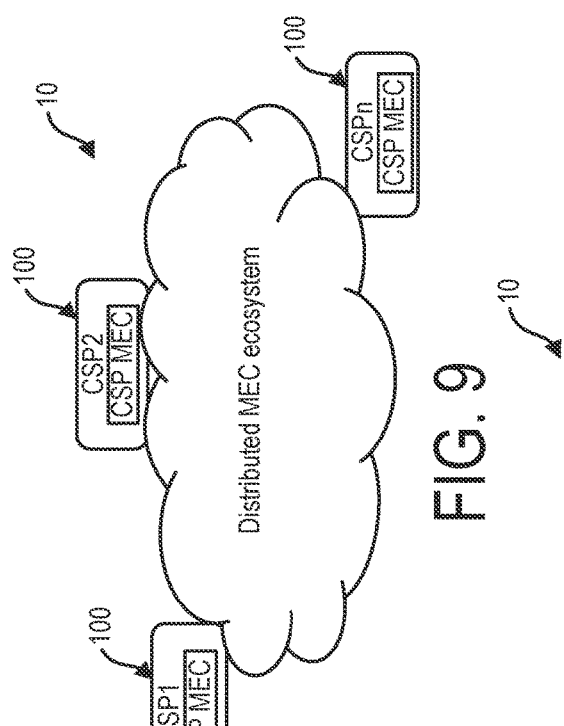
FIG. 9 depicts a MEC environment, according to one embodiment.

A schematic diagram of MEC environment 10 from the perspective of edge enterprise entity is shown in FIG. 9. Edge enterprise entity CSPs can be part of MEC environment 10 defined by a distributed ecosystem by providing MEC services at its network edge or can consume services from different MEC providers. Edge enterprise entity CSPs may have their own MEC platform for few services or capabilities. Edge enterprise entity CSPs may also offer these MEC capabilities to other edge enterprise entity CSPs similarly as any other MEC provider.

MEC environment 10 can provide an integrated global ecosystem of MEC capability providers and MEC platform providers. In one scenario there can be a relatively few MEC platform providers with a relatively large number of MEC capability providers. MEC platform providers and MEC capability providers can be interconnected in the form of a mesh and exchange ledger data using ledger data structure 120. The ecosystem defined by MEC environment 10 herein can be regarded as a capability chain and it can follow the same working principle of a distributed ledger as in Blockchain. MEC capabilities (as applications) can be hosted and managed in MEC platforms 100. An edge enterprise entity CSP herein may be ultra-lean by providing only edge infrastructure, e.g., RANs within minimal services extensible by the architecture herein or may be a traditional edge enterprise entity CSP that builds almost all needed functionality or anything in between.

Figure 10:
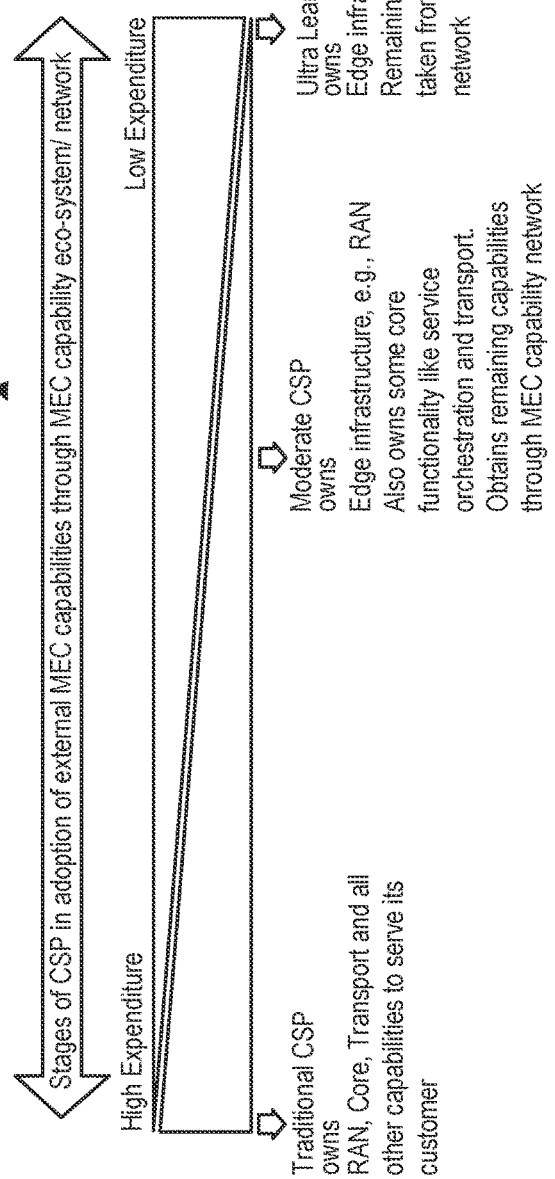
FIG. 10 is a diagram illustrating types of edge enterprise entity enterprises, according to one embodiment.

As indicated by the diagram of FIG. 10, MEC environment 10 can facilitate different levels of participation by edge enterprise CSPs. MEC environment 10 can include traditional edge enterprise entity CSPs. Traditional edge enterprise CSPs can build all infrastructure on its own or through a sub-contractor. MEC environment 10 can include moderate edge enterprise entities. Moderate edge enterprise entity CSPs can build some infrastructure on its own but for remaining capabilities, it becomes part of a MEC capability eco-system and joins service capability applications provided by external enterprise entities including enterprise entities other that edge enterprise entities. A moderate edge enterprise entity CSP may retain such capabilities as a service orchestration capability, service assurance capabilities, a direct link with other edge enterprise entity CSPs for service porting, or end-to-end encryption. MEC environment 10 can include ultra-lean edge enterprise entity CSPs. An ultra-lean edge enterprise can own, operate, and/or control an edge network defined by a RAN, operate its own infrastructure, and build services by joining capabilities from external MEC capability providers. Hence, it is a complete edge enterprise entity CSP that does not incur extensive investment to build capability. Instead it takes them from other capability providers as per need.

Figure 11:
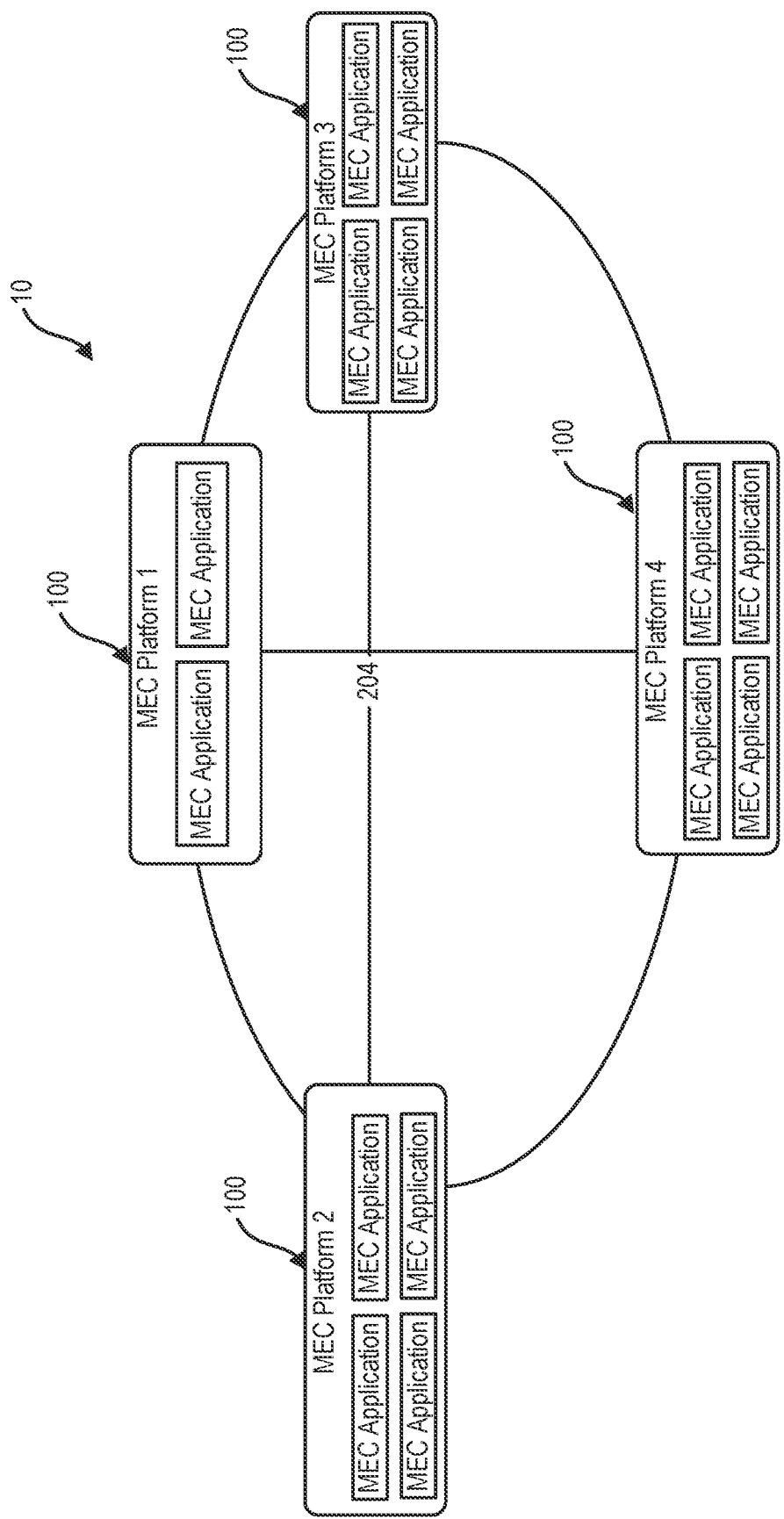
FIG. 11 depicts a MEC environment, according to one embodiment.

Referring to FIG. 11, MEC environment 10 can be defined by a distributed MEC Ecosystem. MEC environment 10 can include multiple MEC platforms which can be connected to each other in the form of mesh and ring according to one embodiment. Each MEC platform 100 can host multiple MEC applications which provide MEC capabilities and the respective MEC platforms 100 can publish the capabilities in MEC capability ledger of ledger data structure 120 shared between MEC platforms 100. A MEC platform 100 can host MEC application and can establish connectivity with other MEC platforms 100. MEC applications can include MEC service delivery applications and/or MEC service capability applications. A MEC service delivery application can join a MEC capability application to extend service functioning of the MEC service delivery application. MEC platforms 100 can be configured to provide updating and sharing of a MEC capability ledger of MEC ledger data structure 120. MEC platforms 100 can provide minor functionality to regulate and control information in a capability chain.

MEC environment 10 can be configured so that MEC platforms 100 can be graded based on quality of service, compliance to security and privacy, geographical location, and past performance. MEC service capability applications can be developed and hosted to provide one or more capability. Any MEC service capability application owner can choose between MEC platforms 100 to host its MEC application and expose MEC capability. MEC platforms and applications can be connected with each other in the form of mesh and ring. All ledgers of ledger data structure 120 can flow on this connectivity.

Referring again to FIG. 2, the diagram provides an overview of co-working between edge enterprise entity CSPs and MEC ecosystem where a MEC service capability application may be owned by CSP, or by an independent MEC capability provider. The independent MEC capability provider can be an enterprise entity other than an edge enterprise entity. In some use cases, the independent MEC capability provider can be an industry vertical solution provider. Referring to FIG. 2, MEC platforms 100 can be included within an edge enterprise entity network and in some use cases can be defined by infrastructure within a RAN. In some use cases, MEC platforms 100 can be defined within a wireless network at a far edge of a MEC environment, e.g., a MEC platform 100 can be provided by a base station as indicated by locations AA, AB, AC, e.g., a gNodeB base station for reduced latency and fast response. MEC platforms 100, e.g., at locations BA, BB, BC can be located within a fronthaul portion, backhaul portion, or interface portion of a fronthaul/backhaul network, but not far from a wireless network. In one embodiment, MEC platforms 100 within an edge network 500 provided by a RAN can host low latency service capability applications, e.g., IOT data processing, video conferencing, content delivery, location services, and the like. A certain edge enterprise that hosts an edge capability application on its own MEC platform can make the edge capability application available for consumption by service delivery applications of itself or other edge enterprises, or of edge enterprise entities that are not edge enterprise entities.

Edge enterprise entities owning, controlling, and/or operating edge enterprise entity networks can elect to configure their respective MEC platforms 100 as multi-tenancy MEC platforms that host MEC applications of entities other than edge entities. Enterprise entities that are not edge entities can host their MEC applications, e.g., on MEC platforms 100 configured as multi-tenancy MEC platforms within an edge enterprise network or on MEC platforms 100 at a location of locations D1-DZ of data network 2000.

MEC service capability applications hosted within MEC environment 10 including within data network 2000 can be available for consumption by any edge enterprise entity of MEC environment, any enterprise entity that is not an edge enterprise entity, or any end user that participates in MEC environment 10.

Enterprise entities that develop and host MEC applications, such as MEC service delivery applications and service capability applications can include industry vertical enterprise entities that provides industry vertical services specific to a domain, e.g., financial services, IOT services, agriculture services, smart city services, or another specific domain.

Additional aspects of ledger data structure 120 are now described. Ledger data structure 120 can include (a) a capability ledger which can include a baseline capability ledger and a supply ledger, (b) a demand ledger, and (c) an accounting ledger.

An example of a capability ledger of ledger data structure 120 is shown in Table C.

TABLE C

| MEC ID | Capability Category | Capability Sub-Category | Capability Sub-Sub Category | QoS Max | Capacity | Region | Rating | Availability | Latency |
|---|---|---|---|---|---|---|---|---|---|
| XX | XX | XX | XX | XX | XX | XX | XX | XX | XX |

The capability ledger as shown in Table C can record various data for a service capability application. The data can include, e.g., MEC ID, category data, quality of service (QoS) data, capacity, region, performance rating, availability, and latency.

QoS can refer to overall service quality that can be offered by the MEC service capability application. It can further be divided into more granular key performance indicators (KPIs). Capacity can refer to aggregate capacity of the capability offered by MEC service capability application. Region can refer to the geo-political area in which the MEC service capability application can offer service. Availability and latency can refer to performance parameter values for end-to-end capability delivery. MEC platform, 100 which hosts the MEC service capability application, can update the (QoS) data, capacity, performance rating, availability, and latency performance parameter values continuously with precise performance values. Updates can be provided, e.g., after every service delivery by a MEC service capability application for a particular service function capability. MEC platform providers can update shared ledger data structure 120 with most recent parameter values according to an agreed to standard agreed to by participants in MEC environment 10.

According to one embodiment, a capability ledger of ledger data structure 120 can include a supply ledger. An example of a supply ledger is shown in Table D.

TABLE D

| Provider MEC ID 501 | MEC Service ID | Max Availability Capacity | Avg Available Capacity | Min Available Capacity | Metric for Rating | Floor Rate | Discount | Surcharge | Bid Duration |
|---|---|---|---|---|---|---|---|---|---|
| XX | XX | XX | XX | XX | XX | XX | XX | XX | XX |

The Supply ledger of a configuration ledger as shown in Table D can permit a MEC service capability application to define additional parameter values for the service capability application. A supply ledger of a capability ledger can be shared in a MEC environment using actual supply values at that instance in time by MEC capability owner. A supply ledger of a capability ledger can operate in the matter of a stock exchange offer table where a capability owner can provide what they can offer at what rate at the instance of trading time. A supply ledger of a capability ledger can be used to define new offers to end users at competitive rates. MEC application owners can be iteratively writing to ledger data structure 120 to dynamically adjusting parameter values of its supply ledger in dependence on a result of examining demand data of a demand ledger of ledger data structure 120.

In another aspect as set forth herein, ledger data structure 120 can include a demand ledger. An example of a demand ledger of ledger data structure 120 is shown in Table E.

TABLE E

| Consumer MEC ID 601 | MEC Service ID | Max Demand Capacity | Avg Demand Capacity | Min Demand Capacity | Metric for Rating | Max Rate Offered | QoS Demand | Region of Consumption | Demand duration |
|---|---|---|---|---|---|---|---|---|---|
| XX | XX | XX | XX | XX | XX | XX | XX | XX | XX |

MEC environment 10 can be configured so that MEC service delivery application providers who are MEC capability consumers can write demand data to a demand ledger of ledger data structure 120 as shown in Table E. In one scenario, demand data of a MEC service delivery application provider can be written responsively to the running of a service delivery application and responsively to detection of service function extension request. An updated demand ledger with current parameter values can be shared in MEC environment 10 that includes actual demand values at that instant by a MEC capability consumer that may be edge enterprise entity CSP or any other MEC capability consumer. MEC service capability providers can respond to demand data by writing to a capability ledger including a supply ledger to adjust one or more service capability parameter value in response to the demand data. The demand ledger can operate in the manner of a stock exchange Buy table where a capability owner can pick demand at negotiated rate and offer capability at that rate.

Ledger data structure 120 in another aspect can include a financial ledger that logs each buy and sell activity. These can be divided into first and second parts, i.e., buyer ledger and seller ledger. The buyer and seller ledger can operate in the manner of an originating call data record (CDR) and terminating CDR in a typical communication scenario. An example of a buyer ledger of an accounting ledger is shown in Fig. F.

ment which are devices that a consumer user can use to initiate service request towards mobile communication network. UE device 20A-20Z can include Wi-Fi consumer equipment which can include devices that a consumer user can use to initiate service requests toward a Wi-Fi access point. The depicted WLAN aggregator can aggregate all traffic from connected Wi-Fi access points and transports that aggregated traffic toward a fronthaul/backhaul network. Edge network 500 provided by a RAN can include one or more mobile communication node as depicted in FIG. 4. A mobile communication node can include a radio for mobile communication. A mobile communication node can include a distribution unit (DU) in some low latency scenarios. Within the depicted RAN of FIG. 4, distribution units can be connected to centralized units (CU) through F1 interfaces as standardized by 3GPP.

MEC environment 10 can include one or more far edge MEC node as depicted in FIG. 4. A far edge MEC node can provide functions which can be deployed near radio units and DUs to support, e.g., low latency services, traffic management, security, etc.

MEC environment 10 can include one or more edge network cluster as depicted in FIG. 4. In the embodiment of FIG. 4, MEC platform 100 can be provided in the edge network cluster. The depicted edge network cluster can provide MEC capabilities hosted at a centralized unit (CU). In MEC environment 10, these MEC capabilities at a CU act as a service delivery anchor.

TABLE F

| Transaction ID 701 | Buyer ID | Metric for Rating | Consumption Count | Rate | SLA Contracted | SLA Actual | Amount | Region of Consumption | Duration of Consumption in GMT |
|---|---|---|---|---|---|---|---|---|---|
| XX | XX | XX | XX | XX | XX | XX | XX | XX | XX |

The buyer ledger can be used to keep record of actual transaction from a buyer's perspective. It can be further augmented with additional parameter values. An example of a seller ledger of an accounting ledger is shown in Table G.

In reference to MEC platform 100 depicted in FIG. 4, there are described key functionalities that can be provided at MEC platform 100, in this case within a network cluster CU to provide a strongly orchestrated architecture for dis

TABLE G

| Transaction ID 702 | Provider MEC ID | Metric for Rating | Consumption count | Rate | SLA Contracted | SLA Actual | Amount | Region of Consumption | Duration of Consumption in GMT |
|---|---|---|---|---|---|---|---|---|---|
| XX | XX | XX | XX | XX | XX | XX | XX | XX | XX |

The seller ledger of the accounting ledger can be used to keep record of actual transactions from a seller's perspective. It can be augmented with additional parameter values. Service management features of MEC environment 10 can use accounting ledger features set forth herein. Service management features can be provided in an edge enterprise entity CSP MEC platform within edge network 500.

Referring again to FIG. 4, MEC environment 10 of edge network 500 provided a RAN of an edge enterprise entity as shown. In the described example, a MEC platform 100 can be provided by an edge cluster defining a centralized unit (CU) within a fronthaul/backhaul network (FIG. 2) of an edge network provided by a RAN (FIG. 2). MEC platform 100 can host MEC applications including one or more MEC service delivery application and/or one or more service capability application.

MEC environment 10 can include UE devices 20A-20Z. UE device 20A-20Z can include mobile consumer equiptributed on-demand based MEC capability driven service delivery.

Service delivery application 110 (FIG. 1) can employ a service template, a capability template 115, and regulatory end node process 116. Service template 114 can define capabilities associated to delivery of a service to an end user. Service delivery application 110 can use a service template to detect a service function extension request. When a service function extension request is detected, a service delivery application can responsively examine capability data of a capability ledger of ledger data structure 120 to identify a suitable service capability application for performing the service function extension. When a service function extension request is detected, a service delivery application can responsively write demand data to a demand ledger of ledger data structure 120 specifying the service function extension. The distributed MEC ecosystem defined by MEC environment 10 and any MEC application that understands the service can take the demand request in the demand ledger and fulfil by providing a required capability chain to a service delivery application.

The capability template 115 can store details in the form of criterion data specifying one or more criterion defining the capabilities associated to a particular service function. Service template 114 can have a high level capability view, whereas capability template 115 can have detailed specification based on service parameters and also can hold a table with a preferred MEC capability provider against each capability specification. Service template 114 and capability template 115 can be stored in data repository 108 (FIG. 1).

Service delivery application 110 can run regulatory end node process 116. Regulatory end node process 116 can provide a mechanism to have control over data going to an external region and also complying with local regulations while enabling service delivery with external data to its subscriber.

An enterprise entity such as an edge enterprise entity CSP can maintain service template 114 that operates according to a service orchestration process, i.e., all process milestones in the form of capabilities can be defined for fulfillment of a service. Embodiments herein recognize that a delivered service can have different variants depending upon desired service features. For example, an attorney user and a non-attorney user both may want to have a consumer voice call service. Both can initiate a voice call in the same way, but the attorney is willing to pay for premium quality and additional encryption for security. Therefore, while designing service for the attorney, there can be specified additional capabilities respecting high audio quality enablement and application of encryption. Hence, the MEC service template function can pick different views under common voice template for the attorney and the non-attorney. In one embodiment, service delivery application 110 can process voice data to dynamically detected service function extension during runtime of a service delivery application.

Table H depicts attributes of an example service template according to one embodiment. The service template additionally can include control features as are described in Table A and Table B.

TABLE H

| Service | Template | Detailed Template |
| --- | --- | --- |
| Voice | Voice call template | Basic voice call feature<br>Premium voice call template<br>SoS voice call template |
| Internet Access | Internet access template | Basic internet access template<br>Premium internet access template<br>High mobility enabled internet access template<br>High mobility and low latency internet access template |
| Heliographic | Heliographic video template | Heliographic video for entertainment template<br>Heliographic video for educational template<br>Heliographic video for industrial application |

Table I depicts attributes of an example capability template according to one embodiment.

TABLE I

| Service Template | Capability Template | Capability Flow |
| --- | --- | --- |
| Basic voice call feature | Dialed number location identification | Dialed number analysis<br>Destination identification<br>Locate subscriber |
| | Dialed number routing | Route the number and establish link<br>Negotiate service quality parameters<br>Capture mutual quality agreement and willingness to go into call |
| | Bearer setup and call continuity | Establish bearer link based on agreed parameters<br>Maintain call |
| | Call disconnection | Disconnect call |
| | Billing | Analysis call duration and properties<br>Bill the subscribers for all |

Embodiments herein provide for distributed communication service delivery where an edge enterprise entity CSP is not forced to build and own end-to-end service infrastructure. Instead, an edge enterprise entity CSP is capable of delivering any service requested by subscriber customer user at any location by dynamically joining one or more service capability application from various service offers available at that instant from service providers that are part of distributed MEC environment 10 but may be in any part of the world.

Embodiments herein provide for service delivery, authorization and supply-demand negotiation. Through the described methodology, an edge enterprise entity CSP can offer any new service to its customer without going through a complex network build and operation exercise by using virtual or physical network elements or deploying a complete MEC solution for new service.

Further, any enterprise entity can innovate any new service and offer the same by becoming a provider through a MEC capability chain. Hence, new services can be rapidly developed and deployed. The methodology can use ledger data structure 120 provided, e.g., by a Blockchain ledger data structure.

Ledger data structure 120 can include a plurality of ledgers. Ledger data structure 120 can include a capability ledger. In the capability ledger, capability data of and individual MEC service provider can be stored. The capability ledger can be dynamically updated when any new capability is offered or removed. The capability ledger can also hold information of, e.g., capability category parameters, QoS parameters, other KPI parameters, service certification parameters (security, privacy, data transfer, API certification, geo/country specific restrictions/rules), availability parameters, preferences, customer rating, edge enterprise entity CSP rating, and inter-operability KPI parameters.

Capability category parameters can include the capability category parameters as shown in Table J.

TABLE J

Capacity a. International
b. Regional
c. Local
Routing and Switching d. IP
e. MAC
f. MSISDN
Link and Data Network g. IP Link
h. Ethernet link
i. Internet
RCS Suite j. Voice
k. Video
l. Messaging
Location m. Regional
n. International
Policy and Profile o. Policy management
p. Service profile management
q. Subscriber profile management
API r. Service API
s. Management API
AI and ML
Billing and Charging In one embodiment, a capability can include a supply ledger. A supply ledger can be used to register the supply of the capability. Capability providers who have excess capacity and are looking for new demand can publish to the supply ledger. The supply ledger can be used by edge enterprise entity CSPs to understand the availability of the service and proposed pricing so that edge enterprise entity CSPs can run real-time offerings and campaigns to the subscribers for enhanced business opportunity.

In another aspect, ledger data structure 120 can include a demand ledger. A demand ledger can be used to capture demand in real time. When there is a new service function extension request, the demand ledger can be updated with that new request. The demand ledger can be available in real-time in MEC environment 10 and any capability provider can pick the demand to fulfil depending upon the service specification and capability compliance demanded in the demand ledger of ledger data structure 120. According to one embodiment, the capability provider that complies to the demand first (after real-time negotiation with the edge enterprise entity CSP where applicable) can become the demand owner and once demand is owned, then the ownership status can be updated in a demand register of the demand ledger.

In another aspect, ledger data structure 120 can include an accounting ledger. An accounting ledger can use a virtual or real currency framework and after successful contract of demand/supply the accounting ledger can be updated. The accounting ledger can also be updated with partial success and any penalty if realized. In one aspect, a consumer user can be provided with opportunity to rate the service after successful consumption and that may be used for accounting based on a contract. The rating can also be used to update the capability ledger.

Referring to MEC environment 10 of FIG. 2, edge enterprise entity CSPs, MEC platform providers, and MEC application providers (an application provides the capability that is used to enable a service) can be interconnected to design and deliver any service requested by subscriber.

Any enterprise entity can develop a MEC capability and host in a MEC platform. An analogy can be mentioned like any portal/website developer can develop a new website and host on a webserver. MEC platform 100 can update a capability ledger with a new MEC service capability application and float it into the network, advertising the same via ledger data structure 120.

To secure the MEC capability ledger of ledger data structure 120 and avoid fraudulent applications, capability ledger update rights can be restricted. For example, according to one embodiment, the right to update a capability ledger can be restricted to a MEC platform owner enterprise entity. In some embodiments, the right to update and manage ledger data structure can be a capability offered as a service by some specialized MEC service capability applications. MEC service capability applications can be shared in real time and always updated, therefore alleviating a need for MEC service registries in each MEC platform 100.

Individual edge enterprise entity CSPs can provide MEC platforms 100 as shown in MEC environment 10 of FIG. 2 or can be ultra-lean by using all capabilities of service delivery from other MEC capability providers. Edge enterprise entity CSPs can run instances of MEC service delivery application 110 that consume MEC service capability applications as described in connection with FIGS. 1-6, and/or can offer MEC service capability applications to serve other edge enterprise entity CSPs or customers, like other MEC capability providers.

According to one embodiment, an edge enterprise entity CSP can have an edge network provided by a RAN, and a MEC platform defined by one or more computing node of the edge network. The edge enterprise entity CSP can use the remaining functionality through other providers in a MEC capability network, e.g., by joining one or more service capability application hosted on one or more MEC platform disposed anywhere, e.g., in a data network farther from the edge that than the MEC platform 100 of the edge enterprise CSP. By features herein, an enterprise entity CSP can be free to have more functionality built in-house and take only limited functionality from a MEC capability network. Hence, an edge enterprise CEP may be ultra-lean or traditional or anything in between as explained with reference to FIG. 10.

Edge enterprise entity CSPs can acquire fixed capacity and functionality from a capability network based on its forecasted need or may be more agile and follow "just in time" philosophy to contract a capability when actually it needs to deliver specific service. MEC environment 10, as shown in FIG. 2 herein, can alternatively be termed a MEC capability chain or MEC capability network.

Ledger data structure 120 can be provided by a Blockchain ledger data structure according to one embodiment. According to one embodiment, ledger data structure 120 can provide ledger distribution and management, security, privacy, and routing compliant with Blockchain.

Embodiments herein provide a method to offer services and to join and deliver services in non-monolithic structure of conventional CSP. An edge enterprise entity CSP can intercept the service that a subscriber initiates for consumption. Afterwards, an edge enterprise entity CSP can follow a service design process to identify required capabilities. Once capabilities are identified, then an edge enterprise entity CSP can pick capabilities within its network and for remaining capabilities can investigate a supply ledger of a capability ledger. An edge enterprise entity CSP can pick best capabilities with a best offer. An edge enterprise entity CSP can stitch together all capabilities to complete service delivery process and fulfil the service. If an edge enterprise entity CSP has any service forecast, then it can place the service forecast into a demand ledger to negotiate a better offer. The following section on working principles will further elaborate on this.

Embodiments herein identify an unmet need of the communication industry in terms of breaking the edge enterprise entity CSP monolith. A federated and managed delivery of services set forth herein provides value addition and latency reduction in an effective manner. Embodiments herein recognize that as more and more industries creatively imagine new use cases and consumers demand more from their edge enterprise entity CSP providers and with the proliferation of 5G networks, unprecedented network loads can require shifting of computing closer to the point of service. Embodiments herein recognize that demands for edge computing are likely to increase. Embodiments herein provide from management across edge enterprise entity CSPs and MEC platforms.

As shown in FIG. 2, a MEC environment 10 providing a capability ecosystem hosts all MEC capabilities in MEC platforms in its network. Any newly developed MEC capability can be hosted in any MEC platform after due qualification process. The qualification process can include security and privacy compliance, service API structure and compliance to standards, geo-political area covered, quality standard compliance, processing latency, and compliance to communication industry regulations. MEC capabilities can be in any form and can be classified according to structure set forth herein.

According to one embodiment, a MEC service capability application can provide location capability. A MEC application can offer location capability. A MEC application can provide location of the subscriber user in a country or region. A MEC application can have a database configured according to a visitor location register and poll location information from all subscriber users attached to various edge enterprise entity CSPs operating in that region through a standardized common location polling REST API.

When an edge enterprise entity CSP looks for location information of a subscriber user to terminate a call from its subscriber user, then this MEC application can offer location information as capability through a standard REST API.

A MEC service capability application can provide routing and switching capability. Routing capability can be of many categories. According to one example, external region call routing may be considered. When a subscriber initiates an external region call, then an edge enterprise entity CSP service using phone number processing can determine that an external region call has been placed. An edge enterprise entity CSP can be absent an ability to serve an external region call. In this context, as explained with reference to FIGS. 1 and 2, an edge enterprise entity CSP can look for a MEC capability that can provide external region call switching capability. The MEC application picks the best available offer and hands over the call originated by its subscriber to that MEC capability provider. The MEC application takes the call and switches it to the desired location. The same MEC application or platform can also offer an external region link or the edge enterprise entity CSP may take the link capability from some other provider. An edge enterprise entity CSP can share the call details with a MEC capability provider on a pre-defined and standardized open API. The external region capability provider can have algorithms to route the external region call by various existing routing procedure, e.g., dialed number analysis.

Once MEC capabilities of MEC service capability applications are listed in the capability ledger that is shared in the capability network, then a MEC capability provider can offer the service. The MEC capability provider can publish what it can supply at any point of time in the supply ledger of the capability ledger so that the potential MEC service capability consumer can pick and use the service.

Embodiments herein can feature on-demand scenarios where a service capability application is identified and joined to a service delivery application in runtime of the service delivery application. In some embodiments, a service capability application can be identified and/or joined to a service delivery application prior to runtime of the service delivery application. Embodiments herein recognize that edge enterprise entity CSPs can build long term relationships with some MEC platform providers or MEC application providers to simplify the operating process and establish long term financial stability. Such contracts and agreements are specific to edge enterprise entity CSP and MEC service providers. A capability template 115 (FIG. 1) of a service delivery application can record data indicating one or more predetermined service capability application identified and/or joined to a service delivery application prior to runtime of the service delivery application.

According to one embodiment, MEC platform 100 can have a structured header to introduce itself and mention any restriction that it may have while sharing its identity with other MEC platforms. A sample header structure can be provided as set forth in Table K.

TABLE K

Header
<MEC Platform Identity=" Unique Identity" Location="CC+LAC" >
< Service Class="Class 1, Class 2, Class 3">
<User Rating="Rating", End to End Latency="Mil second", Platform Jitter="Jitter rate", Availability=" A vailability rate" >
<Capacity- CPU="Peak time capacity %", Memory="Peak time memory %">
}
i.Details {
i.<Detailed MEC platform capability>
i.<SLA rules>
v.<Rating, Billing and accounting rules >
v.Compliance and certification
i.}

Location may follow the existing location definition used in Telecom industry and can refer to locations in which a MEC platform 100 can provide service instead of referring to only physical location. In the above description, CC is Country Code and LAC is Location Area Code. For example, if a MEC platform is capable of serving the whole world, then it may mention the location as "00," whereas if it's capable of serving only the United States, then it may mention the location as "001," but if it's capable of serving in New York City in the United States, then it may mention the location as "001 NYC".

Service class can refer to a class of service that the MEC platform can support, e.g., in-time service class, on-time service class, ultra-reliable service class, etc. A MEC application provider can select a best suited MEC platform based on requirements of the application. MEC platform owners can verify MEC application credentials and certification before allowing them to be hosted on a platform.

A MEC application can have the following defined structure as shown in Table L to provide application capability information.

TABLE L

```
Header {
<MEC application status=" Unregistered"
b.        <Application Identity="Temporary",
Category="First level category" >
c.        <Security Compliance ="Yes/No",
Industry Compliance= "Yes/No">
}
Details {
<Application Identity="Identity number">
<Sub Category details
<All compliance details>
<Application Service Class="Service class", Application latency="Micro
sec", Memory required="in MB", CPU required="Cycles">
}
```

Initially, application identity can be temporary and all compliances can be marked as No. Once an application is hosted in MEC platform 100, the hosting MEC platform 100 can provide a unique global identity to the MEC application and initiate compliance verification based on category of the service offered by MEC application. Based on successful compliance results, the "header" and "detail" sections of the API can be updated and the MEC platform provider can insert a row for new capability in the MEC capability ledger. A provider of a MEC application may wish to register the MEC application with multiple MEC platform providers. In that situation, the first registration process can follow the above header structure whereas subsequent registrations can have pre-filled details given that the first MEC platform provider has completed all compliance and identity creation processes.

The MEC application can provide its details in a supply ledger after successful registration and it can be searched and reached by any consumer.

An edge enterprise entity CSP can have standing agreements with some of the MEC capability providers or may dynamically pick capabilities from MEC capability network based on need. An edge enterprise entity CSP can pick the capability template based on service needs and look into its capability repository to complete the capability chain to enable the service delivery. When the edge enterprise entity CSP is short of some capability, then it can use the demand ledger of ledger data structure 120 and can initiate a demand by writing to the demand ledger to specify capability details which are required by a service function. Alternatively, an edge enterprise CSP can investigate a supply ledger to pick a service capability application, if needed, that may further reduce any latency. An edge enterprise entity CSP can use a REST API to fetch a demand or supply ledger of ledger data structure 120 and to place new requirements into the demand or supply ledger. The REST API can operate according to MEC API principles according to the recommendations of the European Telecommunications Standards Institute (ETSI), according to one embodiment.

Parameters that can be included in demand data of demand written to a demand ledger can be provided as shown in Table M.

TABLE M

```
{
< edge enterprise entity CSP ID="Identity of the CSP" Location ID
"Location of Capability consumption" Category="MEC Category"
QoS Level="Latency, Jitter, Bit Rate">
Capability Details {
< Sub category="Sub Category" Sub-Sub Category="">
<QoS parameter details>
<Demand SLA Details
}
}
```

While picking a capability in the supply ledger of ledger data structure 120, the edge enterprise entity CSP can confirm details in REST as shown in Table N.

TABLE N

```
{
< edge enterprise entity CSP ID="Identity of the CSP" Location ID
"Location of Capability consumption" MEC Capability ID="ID of MEC
Capability picked QoS Level="Latency, Jitter, Bit
Rate" Offer Rate approved= "Price point ready to pay">
Usage details {
d.        <Start Time="Start time of use needed" Duration=
"Duration for which its needed" PenaltyLevel= "Level of penalty
due to SLA breach" >
e.        }
}
```

Embodiments herein can facilitate service changes during delivery of a service. According to one example, a voice call can be switched to a video conference or sharing images can be facilitated.

Embodiments herein recognize that existing communication services fail to provide uninterrupted service where a service delivery chain is not capable of delivering any changed service. For example, if a call originating or terminating network does not have network capability to support switching of voice call to video conference, then that cannot be done.

Embodiments herein provide a mechanism to add new capabilities during a service delivery session. The addition of a new capability may be from existing capabilities in the service delivery or a new capability. The additional advantage is that while designing service, an edge enterprise entity CSP can predict the additional capabilities needed and bring those capabilities that can be easily used to upgrade or change the service. For example, based on service properties and historical calls, an edge enterprise entity CSP can predict that the new requested voice call may be subject to a service function extension request to switch to a video conference. Therefore, the edge enterprise entity CSP can stitch capabilities for a voice call from a capability provider that supports both voice and video conference switching.

Figure 12:
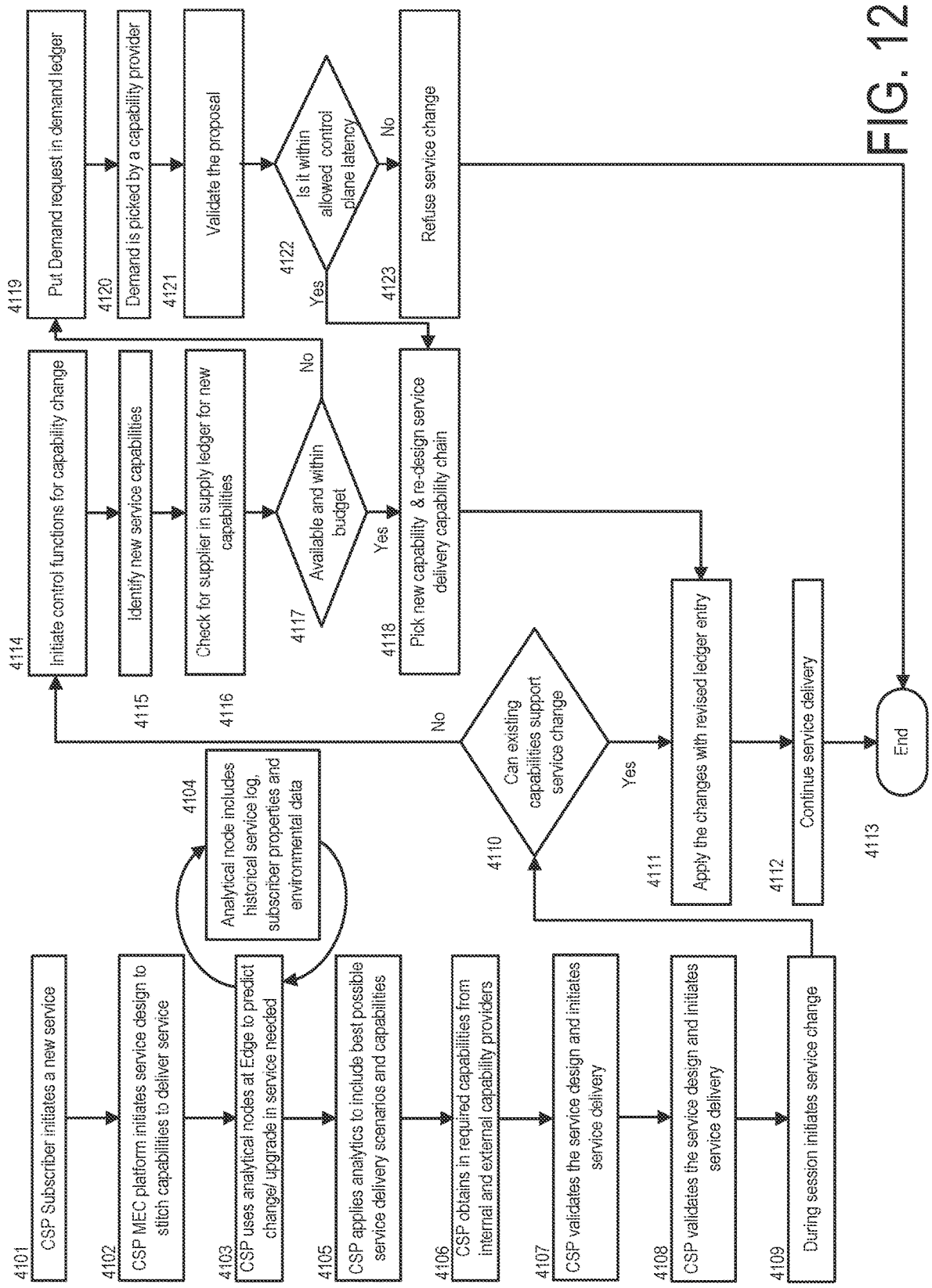
FIG. 12 is a flowchart illustrating performance of a method, according to one embodiment.

The flowchart of FIG. 12 illustrates with reference to blocks 4101-4123 a sample workflow for in-session (i.e., during ongoing runtime service delivery) service change/upgrade. The subscriber user can request service change while already being in a service. The service change may be an upgrade of a service, downgrade of a service, or a new thread.

A subscriber user can initiate a new service at block 4101 and MEC platform 100 hosting a service delivery application can stitch capabilities to deliver a service at block 4102. An edge enterprise entity CSP may have advanced analytics and machine learning functions at its edge node at block 4103 to further analyse and predict behaviour of a subscriber in a service journey. Such analytics function may recommend futuristic service design where an edge enterprise entity CSP may bring in capabilities that may not be required immediately but have a high probability of occurrence during the session. An edge enterprise entity CSP may use the recommendation and stitch the capabilities to initiate service delivery. An edge enterprise entity CSP may bring in capabilities that can be directly upgraded without any new design. For example, if request is for a voice service, then an edge enterprise entity CSP may look into capabilities that support both voice and video call if there is a high probability of switching to video.

During a live session of service delivery, a subscriber may request for addition of a new feature, upgrade, or change of service at block 4109. An edge enterprise entity CSP can perform a check to determine it can support these new service features at block 4110, and if it cannot do so, then it can initiate a capability upgrade through a supply ledger of a capability ledger at block 4116. In some embodiments, checking the supply ledger can be faster than publishing a demand to a demand ledger. Accordingly, during live session modifications, methodology can include checking a supply ledger and then writing to the demand ledger. In the event of a lack of service in a supply ledger, then the edge enterprise entity CSP can write a demand request in the demand ledger of ledger data structure 120 and can obtain a new capability from the capability network. If this process completes within the allowed latency of in-session service change, then the new capability is added and a service change is performed. If the addition of a new capability does not happen within the allowed latency, then the edge enterprise entity CSP can at block 4123 reject the new changes in service for the ongoing session.

Embodiments herein recognize that communication services can support sharing of personal details across industrial players, e.g., medical, legal, social, or educational organizations. Embodiments herein recognize that a communication network needs to protect personal information and country specific information while enabling the service delivery involving multiple instructions and constitutional geographies. Edge enterprise entity CSPs can use analytical capabilities at its edge network to support the data privacy and confidential data sharing needs. Interface end nodes can apply data privacy principles through advanced analytics and ML functions.

Figure 13:
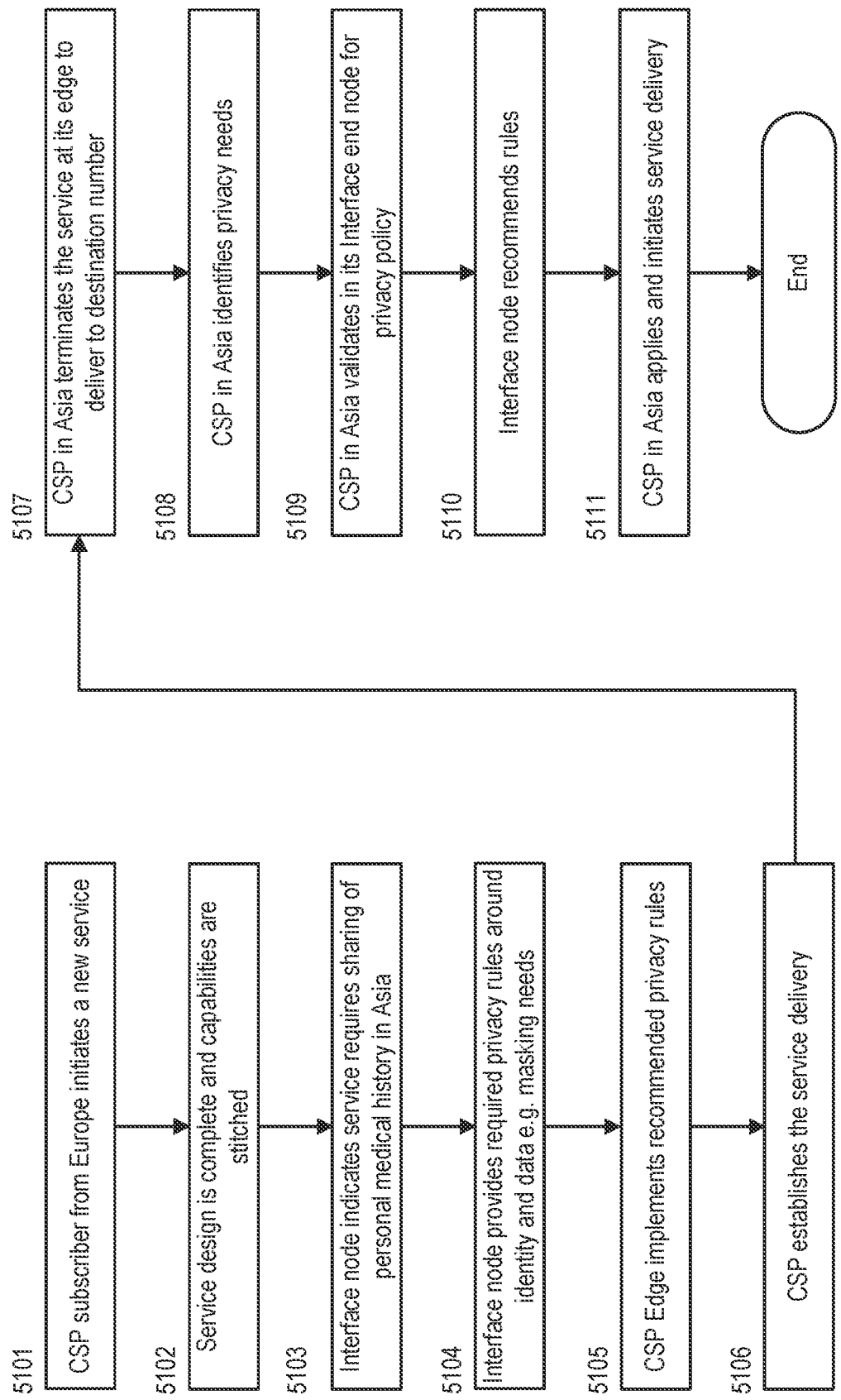
FIG. 13 is a flowchart illustrating performance of a method, according to one embodiment.

FIG. 13 illustrates with reference to blocks 5101-5111 use of interface nodes in a service delivery chain to assist in data privacy scenarios. In one embodiment, an edge enterprise entity CSP can deploy a data analytical interface node at an edge of the network. An interface node can perform data analysis for requested data and can apply the scenarios of data sharing with external agencies at block 5103. The interface node can recommend rules that can be applied to protect privacy at block 5104. The edge enterprise entity CSP or industry vertical solution provider can also engage an interface node to perform a second level of validation based on its local rule and regulation at block 5104. Hence, privacy of the personal data in an end-to-end scenario can be addressed.

Embodiments herein recognize that because complete service delivery at the source and destination end is with the edge enterprise entity CSP; therefore, edge enterprise entity CSPs can adopt any lawful interception (LI) policy at their respective access and edge network. In specific scenarios, MEC platform owners can also adopt LI polices and implement them to safeguard the complete delivery platform.

Within MEC environment 10, security can be offered as a specialized capability for potential subscriber users. An example may be that when a subscriber user who is a stock broker calls a relative, then security may be less of a concern but can be of greater concern when the stock broker calls his client to share some sensitive high value trade deals. A service delivery application can be configured to examine application data including user defined data to join an appropriate service capability application.

MEC environment 10 can be configured to provide service assurance. In many use cases, capability selection can be provided in real time so that capability can be well matched to service requests. Once a proper capability chain is created, there can be minimal risk that there will be any interruption during the service delivery. Individual capabilities can be ranked based on past performance and future opportunity for a capability can depend on the past ratings. Accordingly, each capability provider can be incentivized to continually produce the best service.

Figure 14:
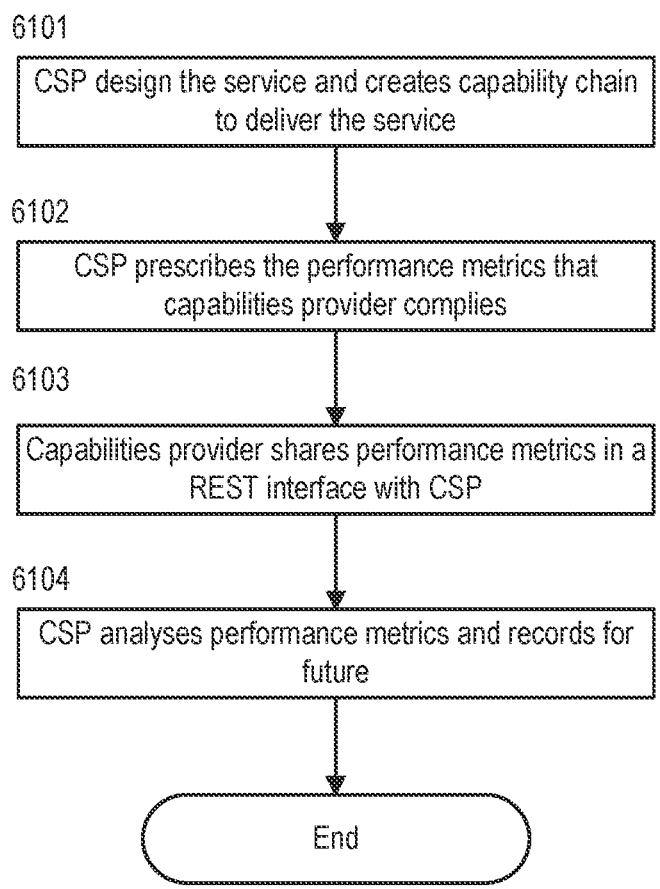
FIG. 14 is a flowchart illustrating performance of a method, according to one embodiment.

The flowchart of FIG. 14 illustrates with reference to blocks 6101-6104 a method for sharing performance metrics during service delivery. According to one embodiment, each capability provider can share its performance metrics during service delivery in a form of performance login near real-time as indicated by block 6104. A capability provider can also produce warnings and recommendations during the ongoing service delivery in case of any risk so that the edge enterprise entity CSP can take corrective action.

Figure 15:
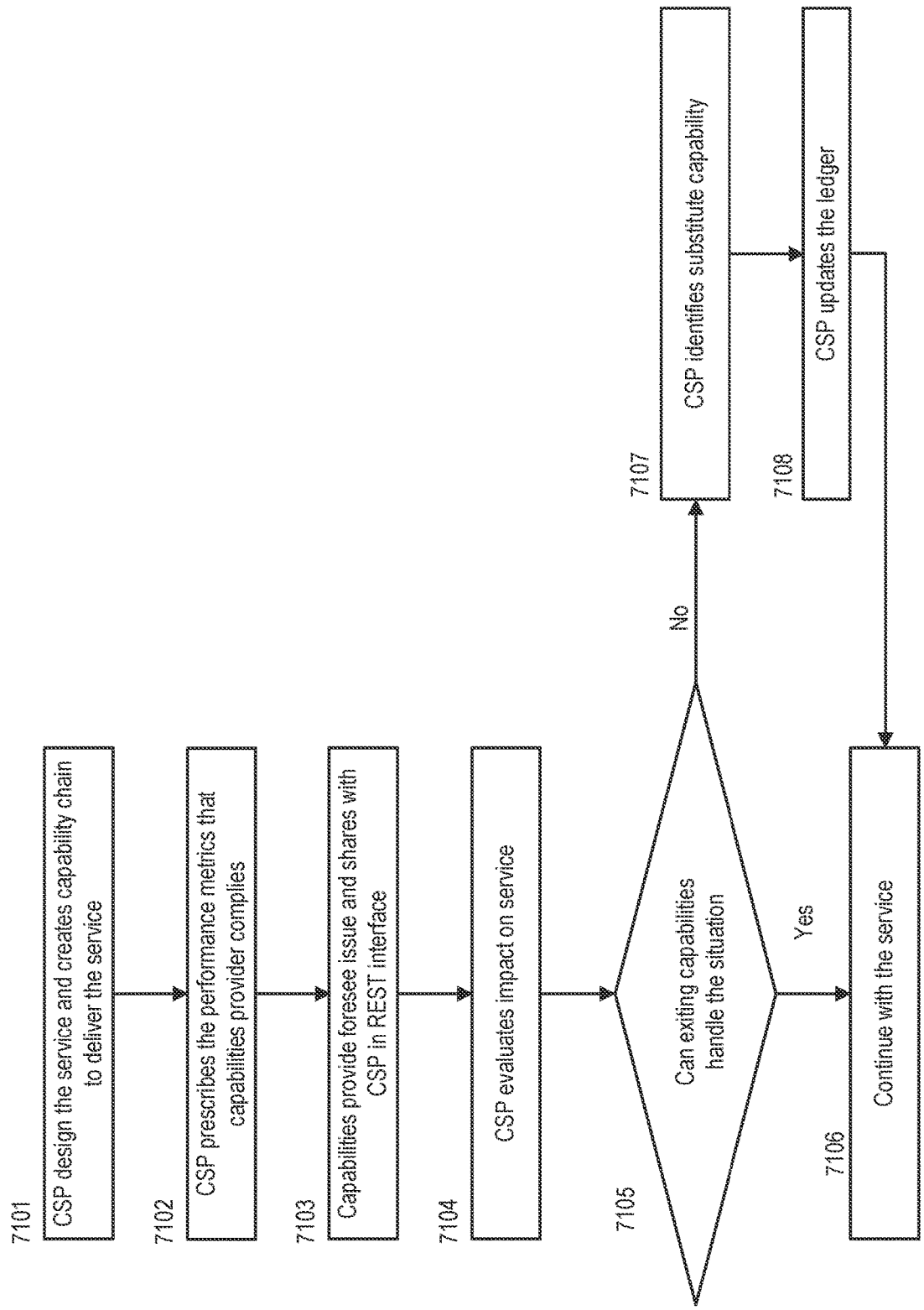
FIG. 15 is a flowchart illustrating performance of a method, according to one embodiment.

The flowchart of FIG. 15 illustrates with reference to blocks 7101-7108 a method for substituting a service capability. In case of a warning, a capability provider can share the details with the edge enterprise entity at block 7103. An edge enterprise entity CSP can evaluate the situation and checks at block 7105 whether the warning is manageable within the existing capabilities of the capability provider. If there is an impact on service, then the edge enterprise entity CSP at block 7107 can substitute the capability.

As set forth herein, service delivery application 110 herein can perform natural language processing (NLP) for determining one or more NLP output parameter value of a message such as a message defined by text data extracted from voice data. Natural language processing herein can include one or more of a topic classification process that determines topics of messages and output one or more topic NLP output parameter, a sentiment analysis process which determines sentiment parameter for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameters, e.g., one of more "social tendency" NLP output parameter or one or more "writing style" NLP output parameter. By performing natural language processing, service delivery application 110 herein can perform a number of processes including one or more of (a) topic classification and output of one or more topic NLP output parameter for a processed message, (b) sentiment classification and output of one or more sentiment NLP output parameter for a processed message, or (c) other NLP classifications and output of one or more other NLP output parameter for the received message.

Topic analysis for topic classification and output of NLP output parameters can include topic segmentation to identify several topics within a message. Topic analysis can apply a variety of technologies, e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." Service delivery application performing natural language processing can return general topics that generally describe more than one species topic, and/or can return species topics, e.g., keyword topics.

Certain embodiments herein may offer various technical computing advantages and practical applications to address problems arising in the realm of computer networks and computer systems. Embodiments herein can feature a multi-access edge (MEC) computer environment having a plurality of MEC platforms. The described MEC environment can facilitate collaboration between different enterprise entities such as between edge enterprise entities that own, operate, and/or control edge infrastructure and enterprise entities other than edge enterprise entities. A plurality of MEC platforms can be distributed within computing environments throughout various locations, including locations within infrastructure of edge enterprise entities and also at locations away from an edge network such as within a data network. The various MEC platforms can host one or more of service delivery application and service capability application. Service capability application providers can advertise their service capability applications on a shared ledger data structure and service capability application consumers such as providers of service delivery applications can examine capability data of the shared ledger data structure to identify service capability applications for joining into a service delivery application. A service delivery application can be configured to use the described shared ledger data structure during runtime processing of a service delivery application to dynamically join during the miming of a service delivery application a service capability application. In some embodiments, a service delivery application can join a service capability application. In one embodiment, a service delivery application hosted on a MEC platform within an edge network can join a service capability application hosted on a data network MEC platform. In some embodiments, a service delivery application hosted on a data network away from an Edge network can join service capability application hosted on a MEC platform within an edge network. A service delivery application during runtime processing of a service delivery application can employ natural language processing to detect a service function extension request. In response to the detection of a service function extension request, a service delivery application can use the described ledger data structure to identify a suitable service capability application for joining into the service delivery application. Some embodiments of service delivery applications in response to the detection of a service function extension request can write demand data to the described ledger data structure in order to specify a demand for a service capability application. The service delivery application can subsequently examine capability data written to the described ledger data structure by service capability providers owning service capability applications in response to the newly published demand data written to the described demand ledger of the ledger data structure. Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 16:
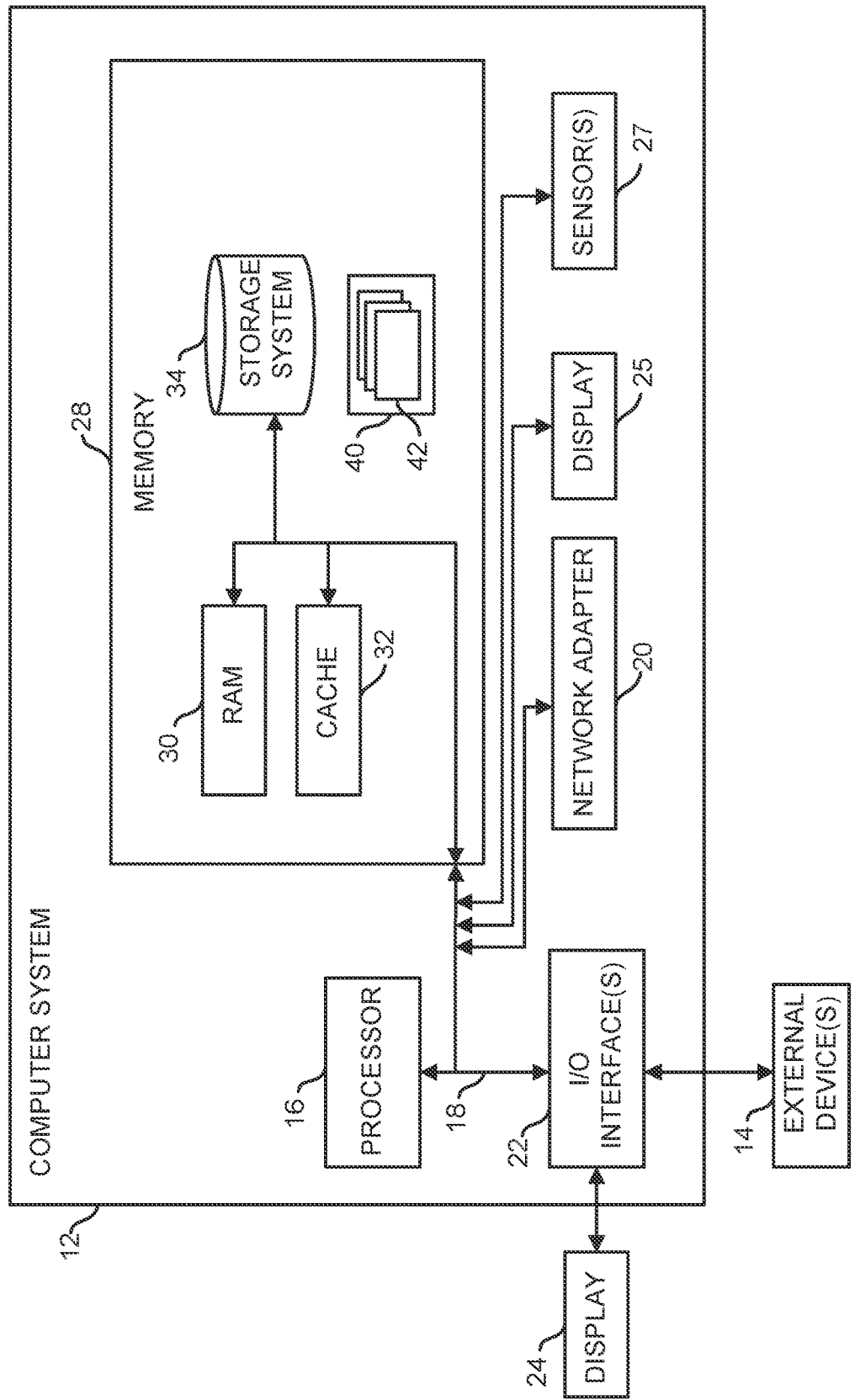
FIG. 16 depicts a computing node, according to one embodiment.
Figure 17:
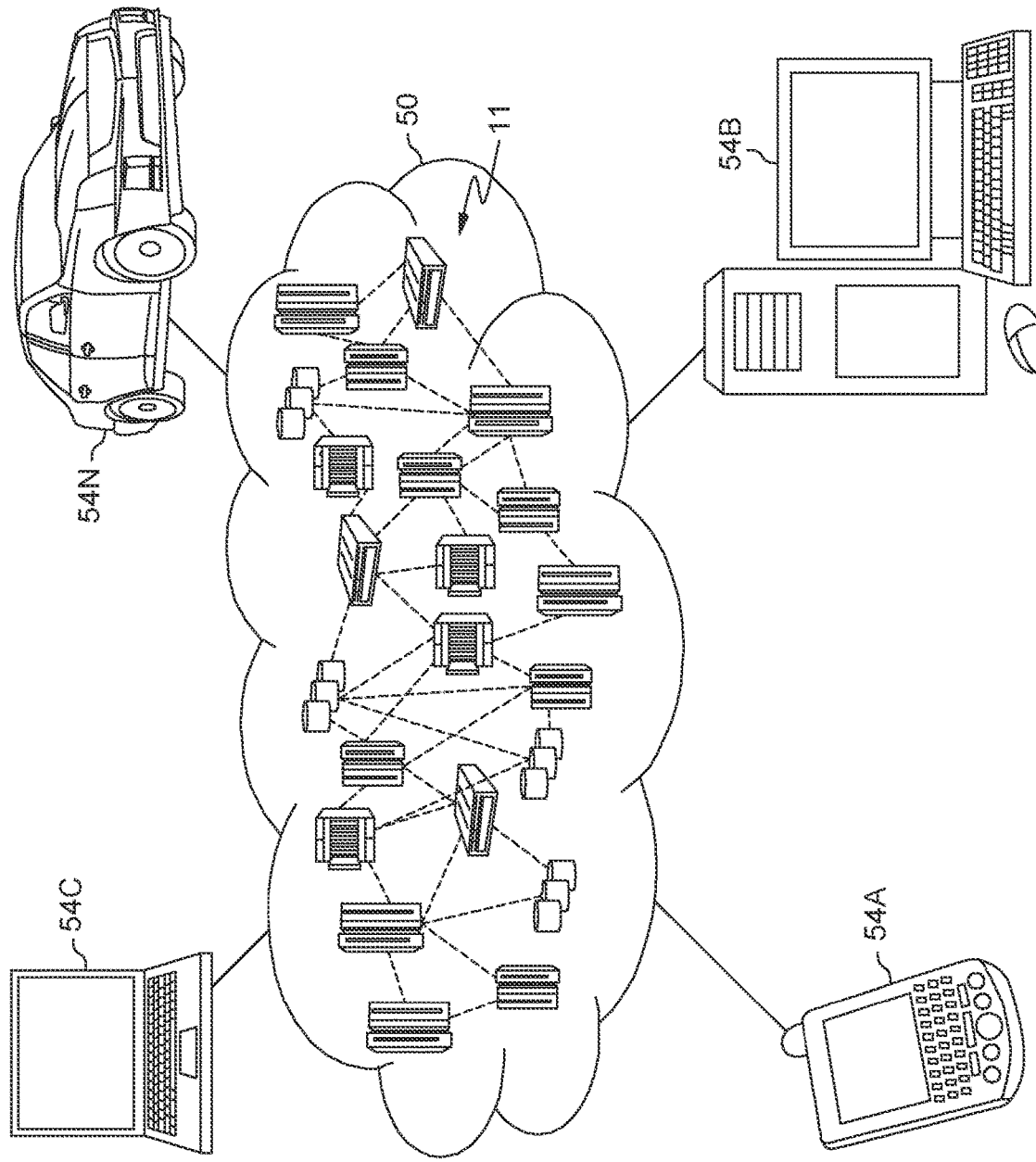
FIG. 17 depicts a cloud computing environment, according to one embodiment.
Figure 18:
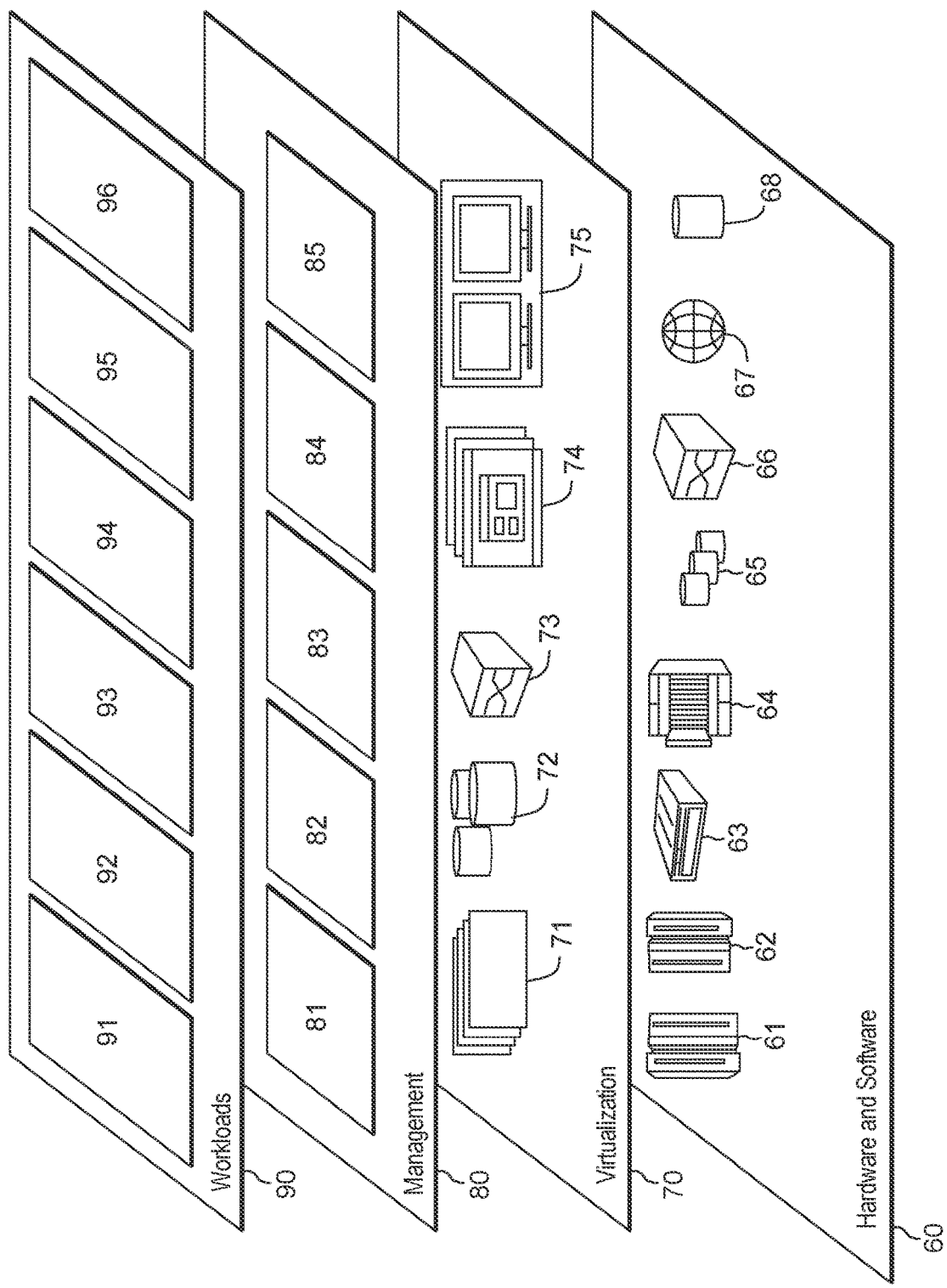
FIG. 18 depicts abstraction model layers, according to one embodiment.

FIGS. 16-18 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 16, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 11 is capable of being implemented and/or performing any of the functionality set forth hereinabove. Computing node 11 can be implemented as a cloud computing node in a cloud computing environment, or can be implemented as a computing node in a computing environment other than a cloud computing environment.

In computing node 11 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 11 is shown in the form of a computing device. The components of computer system 12 may include, but are not limited to, one or more processor 16, a system memory 28, and a bus 18 that couples various system components including system memory 28 to processor 16. In one embodiment, computing node 11 is a computing node of a non-cloud computing environment. In one embodiment, computing node 11 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, MEC platforms 100 herein can include one or more computing node 11 and can include one or more program 40 for performing functions described with reference to MEC platforms 100, including the functions described with reference to service delivery applications 110, service capability applications 140A-140Z and ledger data structure 120. In one embodiment, the computing node based systems having MEC platforms 100 herein defined by one or more computing node 11 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 11 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 11. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 17 computing node 11 is described as being implemented in a cloud computing environment and accordingly is referred to as a cloud computing node in the context of FIG. 17.

Referring now to FIG. 17, illustrative cloud computing environment 50 is depicted. As shown, cloud computing environment 50 comprises one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 11 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for service delivery include collaborative service delivery as set forth herein. The processing components 96 can be implemented with use of one or more program 40 described in FIG. 16.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
examining capability data of a shared ledger data structure, wherein the capability data specifies one or more capability for respective ones of a plurality of service capability applications;
joining a service capability application of the plurality of service capability applications to a service delivery application in dependence on the examining, wherein the joining the service capability application of the plurality of service capability applications to a service delivery application in dependence on the examining includes performing the joining so that a program image for instantiation of a runtime instance of a service capability application is pulled into a computing environment that hosts the service delivery application, wherein the program image for instantiation of a runtime instance of a service capability application instantiates a virtual machine for Dinning of the service capabilitY application; and
running the service delivery application, with the service capability application joined to the service delivery application.

2. The computer implemented method of claim 1, wherein the examining and joining are performed prior to runtime of the service delivery application.

3. The computer implemented method of claim 1, wherein the examining and joining are performed during runtime of the service delivery application.

4. The computer implemented method of claim 1, wherein the method includes writing demand data to the ledger data structure, the demand data specifying one or more criterion for the service capability application.

5. The computer implemented method of claim 1, wherein the service delivery application is hosted on a first multi-access edge (MEC) platform, and wherein the service capability application is hosted on a second MEC platform.

6. The computer implemented method of claim 1, wherein the service delivery application is hosted on a first multi-access edge (MEC) platform, and wherein the service capability application is hosted on a second MEC platform, wherein the first MEC platform is located in an edge network, and wherein the second MEC platform is located within a computing environment farther from an edge end than the first MEC platform.

7. The computer implemented method of claim 1, wherein the service delivery application is hosted on a first MEC platform, and wherein the service capability application is hosted on a second MEC platform, wherein the first MEC platform is located in an edge network, and wherein the first MEC platform is located within a computing environment farther from an edge end than the second MEC platform.

8. The computer implemented method of claim 1, wherein the method includes, during runtime processing of the service delivery application, processing application data of the service delivery application to detect a service function extension request, and responsively to the service function extension request, performing the examining and the joining.

9. The computer implemented method of claim 1, wherein the method includes, during runtime processing of the service delivery application, processing application data of the service delivery application to detect a service function extension request, and responsively to the service function extension request, performing the examining and the joining, wherein the processing application data of the service delivery application to detect a service function extension request includes subjecting user defined data of an end user of the service delivery application to natural language processing to extract a topic from the user defined data.

10. The computer implemented method of claim 1, wherein the method includes, during runtime processing of the service delivery application, processing application data of the service delivery application to detect a service function extension request, and responsively to the service function extension request, performing the examining and the joining, wherein the processing application data of the service delivery application to detect a service function extension request includes subjecting user defined voice based data of an end user of the service delivery application to natural language processing to extract a topic from the user defined voice based data.

11. The computer implemented method of claim 1, wherein the method includes writing demand data to the ledger data structure, the demand data specifying one or more criterion for the service capability application, and wherein the examining and joining are performed subsequently to the writing.

12. The computer implemented method of claim 1, wherein the service delivery application delivers a service to a user and wherein the examining and the joining are performed responsively user defined data of the user generated during the running of the service delivery application.

13. A computer program product comprising:
a computer readable storage medium readable by one or more processing circuit and storing instructions for execution by one or more processor for performing a method comprising:
examining capability data of a shared ledger data structure, wherein the capability data specifies one or more capability for respective ones of a plurality of service capability applications; joining a service capability application of the plurality of service capability applications to a service delivery application in dependence on the examining, wherein the joining the service capability application of the plurality of service capability applications to a service delivery application in dependence on the examining includes performing the joining so that a program image for instantiation of a runtime instance of a service capability application is pulled into a computing environment that hosts the service delivery application, wherein the program mage for instantiation of a runtime instance of a service capability application instantiates a virtual machine for runninit of the service capability application; and
running the service delivery application, with the service capability application joined to the service delivery application.

14. A system comprising:
a memory;
at least one processor in communication with the memory; and
program instructions executable by one or more processor via the memory to perform a method comprising:
examining capability data of a shared ledger data structure, wherein the capability data specifies one or more capability for respective ones of a plurality of service capability applications;
joining a service capability application of the plurality of service capability applications to a service delivery application in dependence on the examining, wherein the joining the service capability application of the plurality of service capability applications to a service delivery application in dependence on the examining includes performing the joining so that a program image for instantiation of a runtime instance of a service capability application is pulled into a computing environment that hosts the service delivery application, wherein the program image for instantiation of a runtime instance of a service capability application instantiates a virtual machine tier running of the service capability application; and
running the service delivery application, with the service capability application joined to the service delivery application.

15. The system of claim 14, wherein the service delivery application is a telephone call service delivery application for support of a telephonic call, wherein the service capability application performs routing of the telephonic call, wherein the method includes, during runtime processing of the service delivery application, processing application data of the service delivery application to detect a service function extension request, and responsively to the service function extension request, joining a second service capability application to the service delivery application, the second service capability application performing certain security processing of user defined voice based data of the telephonic call, wherein the processing application data of the service delivery application to detect a service function extension request includes subjecting user defined voice based data of an end user of the service delivery application to natural language processing to extract a topic from the user defined voice based data.

16. The computer implemented method of claim 4, wherein the method includes selecting the service delivery application from a remainder of the plurality of service capability applications based on a determining that the one or more criterion specified by the demand data written to the ledger data structure has been satisfied.

17. The computer implemented method of claim 1, wherein the method includes writing demand data to the ledger data structure, the demand data specifying one or more criterion for the service capability application, wherein the method includes selecting the service delivery application from a remainder of the plurality of service capability applications based on a determining that the one or more criterion specified by the demand data written to the ledger data structure has been satisfied, and wherein the one or more criterion specified by the demand data specifies a timing requirement for completion of a demand defined by the demand data.

18. The computer implemented method of claim 1, wherein the service delivery application is a telephone call service delivery application for support of a telephonic call, wherein the service capability application performs routing of the telephonic call, wherein the method includes, during runtime processing of the service delivery application, processing application data of the service delivery application to detect a service function extension request, and responsively to the service function extension request, joining a second service capability application to the service delivery application, the second service capability application performing certain security processing of user defined voice based data of die telephonic call, wherein the processing application data of the service delivery application to detect a service function extension request includes subjecting user defined voice based data of an end user of the service delivery application to natural language processing to extract a topic from the user defined voice based data.

19. The computer implemented method of claim 1, wherein the service capability application has been developed by an enterprise entity other than an enterprise entity that has developed the service delivery application.

20. The system of claim 14, wherein the service capability application has been developed by an enterprise entity other than an enterprise entity that has developed the service delivery application.

* * * * *